(12) United States Patent
Inoue

(10) Patent No.: US 11,399,001 B2
(45) Date of Patent: Jul. 26, 2022

(54) CONTROLLER FOR TRANSMITTING INFORMATION ON MACHINE OR CONTROLLER VIA E-MAIL

(71) Applicant: FANUC CORPORATION, Yamanashi (JP)

(72) Inventor: Shogo Inoue, Minamitsuru-gun (JP)

(73) Assignee: FANUC CORPORATION, Yamanashi (JP)

( * ) Notice: Subject to any disclaimer, the term of this patent is extended or adjusted under 35 U.S.C. 154(b) by 861 days.

(21) Appl. No.: 14/155,619

(22) Filed: Jan. 15, 2014

(65) Prior Publication Data
US 2014/0214985 A1    Jul. 31, 2014

(30) Foreign Application Priority Data

Jan. 29, 2013    (JP) .............................. JP2013-014337

(51) Int. Cl.
| | |
|---|---|
| *H04L 51/23* | (2022.01) |
| *H04L 51/56* | (2022.01) |
| *H04L 51/00* | (2022.01) |
| *H04L 12/18* | (2006.01) |

(52) U.S. Cl.
CPC .......... *H04L 51/30* (2013.01); *H04L 12/1895* (2013.01); *H04L 51/00* (2013.01); *H04L 51/36* (2013.01)

(58) Field of Classification Search
CPC ... H04L 41/0631; H04L 41/069; H04L 43/04; H04L 12/1895; H04L 12/2602; H04L 12/581; H04L 12/00; H04L 67/22; H04L 67/26; H04L 67/12; H04L 51/30; H04L 51/00; G05B 23/0254

USPC .......................... 709/206; 715/752; 719/318
See application file for complete search history.

(56) References Cited

U.S. PATENT DOCUMENTS

| | | | | |
|---|---|---|---|---|
| 5,127,087 A | * | 6/1992 | Kasiraj ................... | H04L 51/00 709/206 |
| 6,510,454 B1 | * | 1/2003 | Walukiewicz ...... | H04L 12/5875 709/200 |
| 6,954,720 B2 | * | 10/2005 | Oya ................... | G03G 15/5075 702/182 |

(Continued)

FOREIGN PATENT DOCUMENTS

| | | |
|---|---|---|
| CN | 1504940 A | 6/2004 |
| CN | 101552743 A | 10/2009 |

(Continued)

OTHER PUBLICATIONS

Y. Li, M. Zhang and J. Gu, "An Email Server Optimized for Storage Issues," 2011IEEE 10th International Conference on Trust, Security and Privacy in Computing and Communications, Changsha, 2011, pp. 1437-1443. (Year: 2011).*

(Continued)

*Primary Examiner* — Brian Whipple
(74) *Attorney, Agent, or Firm* — Faegre Drinker Biddle & Reath LLP

(57) ABSTRACT

A controller that controls a machine detects an event that has occurred in the controller or the machine to compose and store event information that contains the event. Upon receiving an e-mail acquisition request from a terminal, the controller retrieves the stored event information, composes an e-mail that contains the event information, and transmits the e-mail directly to the terminal.

14 Claims, 19 Drawing Sheets

(56) References Cited

U.S. PATENT DOCUMENTS

| | | | |
|---|---|---|---|
| 2003/0002634 A1* | 1/2003 | Gupta | H04L 12/589 379/88.13 |
| 2003/0060900 A1* | 3/2003 | Lo | G05B 23/027 700/19 |
| 2003/0140133 A1 | 7/2003 | Huntley et al. | |
| 2003/0229414 A1* | 12/2003 | Nakazawa | G05B 19/408 700/175 |
| 2004/0152449 A1 | 8/2004 | Koshihara | |
| 2004/0205140 A1* | 10/2004 | Ikeno | H04N 1/00204 709/206 |
| 2005/0197142 A1* | 9/2005 | Major | H04L 12/58 455/466 |
| 2005/0289190 A1* | 12/2005 | Powell | G06F 17/30613 |
| 2006/0121889 A1* | 6/2006 | Contreras Alvarez | H04M 1/72552 455/414.1 |
| 2009/0254748 A1 | 10/2009 | Mochizuki | |
| 2010/0023156 A1* | 1/2010 | Trepina | G05B 19/406 700/175 |
| 2010/0228830 A1 | 9/2010 | Uchida | |
| 2010/0229182 A1* | 9/2010 | Ito | G06F 9/546 719/314 |
| 2011/0167041 A1* | 7/2011 | Fu | G06F 17/30575 707/634 |
| 2012/0154138 A1* | 6/2012 | Cohn | G08B 25/004 340/501 |

FOREIGN PATENT DOCUMENTS

| | | |
|---|---|---|
| CN | 101753484 A | 6/2010 |
| CN | 101878473 A | 11/2010 |
| DE | 10301955 A1 | 7/2003 |
| JP | 2000-075907 A | 3/2000 |
| JP | 2000-244556 A | 9/2000 |
| JP | 2001-306140 A | 11/2001 |
| JP | 2002-312011 A | 10/2002 |
| JP | 2003-022112 A | 1/2003 |
| JP | 2005-005798 A | 1/2005 |
| JP | 2005-107788 A | 4/2005 |
| JP | 2005-284711 A | 10/2005 |
| JP | 4881516 B2 | 2/2012 |

OTHER PUBLICATIONS

Notification of Reasons for Refusal dated Nov. 10, 2015 in Japanese Patent Application No. 2013-14337 (4 pages) with an English Translation (4 pages).

Office Action dated Jul. 12, 2017 in German Patent Application No. 10 2014 000 787 (7 pages) with an English translation (7 pages).

The Notification of the First Office Action dated Jul. 7, 2017 in Chinese Patent Application No. 2014100433243 (9 pages) with an English translation (11 pages).

\* cited by examiner

CONTROLLER FOR TRANSMITTING INFORMATION ON MACHINE OR CONTROLLER VIA E-MAIL

RELATED APPLICATION DATA

This application claims priority under 35 U.S.C. § 119 and/or § 365 to Japanese Application No. 2013-014337 filed Jan. 29, 2013, the entire contents is incorporated herein by reference.

BACKGROUND OF THE INVENTION

1. Field of the Invention

The present invention relates to a controller such as a numerical controller that controls a machine tool or an industrial machine, a robot controller, or a programmable logic controller. In particular, the present invention relates to a controller that transmits information on a machine or a controller via an e-mail.

2. Description of the Related Art

A remote monitoring system is used for the purpose of monitoring events (for example, alarm information, operating information, or the like of manufacturing equipment) that an operator who controls manufacturing equipment (a machine tool, a robot, or an industrial machine) which is a control target of a controller (including a numerical controller that controls a machine tool or an industrial machine, a robot controller, or a programmable logic controller) should know.

This remote monitoring system allows the operator of the manufacturing equipment to know the occurrence of an event that the operator of the manufacturing equipment should know when an e-mail that contains the event arrives at a mobile terminal (for example, a portable phone, a portable PC, or the like) or a desktop PC which is possessed by the operator of the manufacturing equipment and is located at a distance from the field where the manufacturing equipment is installed. In the manufacturing equipment, a mail client operates on an e-mail transmission PC which is a device separate from the controller, and a mail server operates on a device (for example, a mail server PC) separate from the manufacturing equipment or the mobile terminal.

A basic flow of e-mail in an e-mail system will be described with reference to FIG. 19. In general, the e-mail system includes a mail user agent (MUA) that provides a user interface, a mail transfer agent (MTA) that determines a delivery path of an e-mail, a mail delivery agent (MDA) that delivers the e-mail, a mailbox that stores the e-mail, and a mail retrieval agent (MRA) that retrieves the e-mail stored in the-mailbox.

A transmission-side-mail client 10 includes an MDA 11, an MTA 12, and an MUA 13. A reception-side-mail client 40 includes an MUA 41. A transmission-side-mail server 20 includes an MTA 21 and an MDA 22. A reception-side-mail server 30 includes an MTA 31, an MDA 32, a mailbox 33, and an MRA 34.

The transmission-side-mail client 10 transmits an e-mail composed by a sender of the e-mail to the transmission-side-mail server 20 according to a simple mail transfer protocol (SMTP). The transmission-side-mail server 20 delivers the e-mail received from the transmission-side-mail client 10 to the reception-side-mail server 30 according to the SMTP. The reception-side-mail server 30 stores the e-mail delivered from the transmission-side-mail server 20 in the mailbox 33. The reception-side-mail client 40 retrieves the e-mail from the mailbox 33 of the reception-side-mail server 30 according to a post office protocol (POP) or an Internet mail access protocol (IMAP).

As a conventional technique, for example, Japanese Patent Application Laid-Open No. 2000-75907 discloses a technique of incorporating an e-mail transmission/reception device into a machine tool to allow a production control PC to collect e-mails that contain alarm information of the machine tool and to allow the production control PC to issue machining instructions to the machine tool. Moreover, Japanese Patent Application Laid-Open No. 2003-22112 discloses a technique of allowing a PC controlling a machine tool to transmit an e-mail that contains machining result information or alarm information of the machine tool to a mobile terminal or a PC located at a distance from the machine tool via a mail server.

FIG. 20 is a diagram for describing a conventional e-mail system that uses a public network.

Even when manufacturing equipment 50 transmits an e-mail that contains alarm information to be sent to an operator of the manufacturing equipment 50, located immediately close to the manufacturing equipment 50, from the location where the manufacturing equipment 50 (for example, a robot 51, a machine tool 52, or an e-mail transmission PC 53) is installed, an e-mail reception mobile terminal 71 possessed by the operator of the manufacturing equipment 50 receives an e-mail that contains alarm information via an e-mail system that uses a public network (for example, an Internet network 63 or a mobile communication network) (see e-mail reception 70).

FIG. 21 is a diagram for describing a conventional e-mail system that does not use a public network.

In a small-scale network that does not use a public network, even when an e-mail reception mobile terminal 72 (for example, a smartphone or a tablet) equipped with a wireless LAN function is used, it is necessary to prepare a transmission/reception mail server 74 for delivering e-mails in order to allow the e-mail reception mobile terminal 72 to receive an e-mail that contains alarm information from the manufacturing equipment 50 (see e-mail reception 70).

As described above, the use of the public network incurs additional labor for connecting to the public network and the cost for using the public network, whereas the use of a small-scale network that does not use the public network incurs labor for preparing a transmission/reception mail server and the cost for purchasing the transmission/reception mail server.

Moreover, an e-mail is transmitted from the e-mail transmission PC 53 whenever an alarm is generated in the manufacturing equipment 50. Thus, when the alarm is cleared immediately after the alarm is generated in the manufacturing equipment 50, the transmitted e-mail cannot be canceled but an unnecessary alarm notification is received by the operator of the manufacturing equipment 50.

Moreover, when an alarm is continuously generated in the manufacturing equipment 50, a plurality of e-mails (see e-mail transmission 62) is continuously transmitted from the e-mail transmission PC 53, and the e-mail reception mobile terminal 71 or 72 receives a plurality of e-mails (see e-mail reception 70). Thus, the operator of the manufacturing equipment 50 cannot immediately understand an alarm generation state of the manufacturing equipment 50.

SUMMARY OF THE INVENTION

The present invention has been made in view of the problems of the conventional technique and an object of the present invention is to provide a controller that transmits information on a machine or the controller via an e-mail.

A controller of the present invention has a function of transmitting information on the controller or a machine controlled by the controller from the controller to a terminal located at a distance from the controller via an e-mail.

According to a first aspect, the controller includes: an event detector that detects an event that has occurred in the controller or the machine; an event information composer that composes event information containing at least one event that has occurred in the controller or the machine; an event information memory that stores the event information composed by the event information composer; an e-mail acquisition request receiver that receives an e-mail acquisition request from the terminal; an e-mail composer that acquires the event information stored in the event information memory based on the received e-mail acquisition request and composes an e-mail that contains the event information; and an e-mail transmitter that transmits the e-mail containing the event information and composed by the e-mail composer, directly to the terminal.

The controller may further include at least one of: an event information adder that, when a new event occurs after the event information is composed, adds the event to the event information stored in the event information memory; an event information updater that updates the event contained in the event information stored in the event information memory when the event contained in the event information stored in the event information memory is changed after the event information is composed; and an event information deleter that deletes the event from the event information stored in the event information memory when the event is canceled after the event information is composed.

The e-mail acquisition request receiver and the e-mail transmitter may include a post office protocol (POP) server processor for transmitting the e-mail to a POP client based on a POP communication protocol.

The e-mail acquisition request receiver and the e-mail transmitter may include an Internet mail access protocol (IMAP) server processor for transmitting the e-mail to an IMAP client based on an IMAP communication protocol.

The event information may be any one of alarm information of the controller, alarm information of the machine, operating information of the controller, and operating information of the machine.

According to a second aspect, the controller includes: an event detector that detects an event that has occurred in the controller or the machine; an event information composer that composes event information containing at least one event that has occurred in the controller or the machine; an event information memory that stores the event information composed by the event information composer; an event information change detector that detects a change in the event information stored in the event information memory; an e-mail composer that, when the event information change detector has detected a change in the event information, acquires the event information stored in the event information memory and composes an e-mail that contains the event information; an e-mail memory that stores the e-mail composed by the e-mail composer; an e-mail acquisition request receiver that receives an e-mail acquisition request from the terminal; and an e-mail transmitter that transmits the e-mail that contains the event information stored in the e-mail memory directly to the terminal based on the received e-mail acquisition request.

The controller may further include at least one of: an event information adder that, when a new event occurs after the event information is composed, adds the event to the event information stored in the event information memory; an event information updater that, when the event contained in the event information stored in the event information memory is changed after the event information is composed, updates the event contained in the event information stored in the event information memory; and an event information deleter that deletes the event from the event information stored in the event information memory when the event is canceled after the event information is composed.

The controller may further include at least one of: an event information adder that, when a new event occurs after the event information is composed, adds the new event to the event information stored in the event information memory; an event information updater that updates the event contained in the event information stored in the event information memory when the event contained in the event information stored in the event information memory is changed after the event information is composed; and an event information deleter that, when the event is canceled after the event information is composed, deletes the canceled event from the event information stored in the event information memory. The controller may further include at least one of: an e-mail updater that updates the event information contained in the e-mail composed by the e-mail composer, when a new event occurs after the event information is composed and the event information change detector has detected that the event is added to the event information, or when the event information change detector has detected a change in the event contained in the event information after the event information is composed; and an e-mail deleter that, when the event information change detector has detected that at least one event has been canceled after the event information is composed, deletes this event of the event information contained in the e-mail composed by the e-mail composer, and that, when the event information change detector has detected that all events have been canceled after the event information is composed, deletes the e-mail composed by the e-mail composer.

The e-mail acquisition request receiver and the e-mail transmitter may include a post office protocol (POP) server processor for transmitting the e-mail to a POP client based on a POP communication protocol.

The e-mail acquisition request receiver and the e-mail transmitter may include an Internet mail access protocol (IMAP) server processor for transmitting the e-mail to an IMAP client based on an IMAP communication protocol.

The event information may be any one of alarm information of the controller, alarm information of the machine, operating information of the controller, and operating information of the machine.

According to the present invention, it is possible to provide a controller having a function of transmitting information on the controller or a machine controlled by the controller from the controller to a terminal located at a distance from the controller via an e-mail.

BRIEF DESCRIPTION OF THE DRAWINGS

The forgoing and other objects and feature of the invention will be apparent from the following description of preferred embodiments of the invention with reference to the accompanying drawings, in which.

DETAILED DESCRIPTION OF THE PREFERRED EMBODIMENTS

Figure 1:
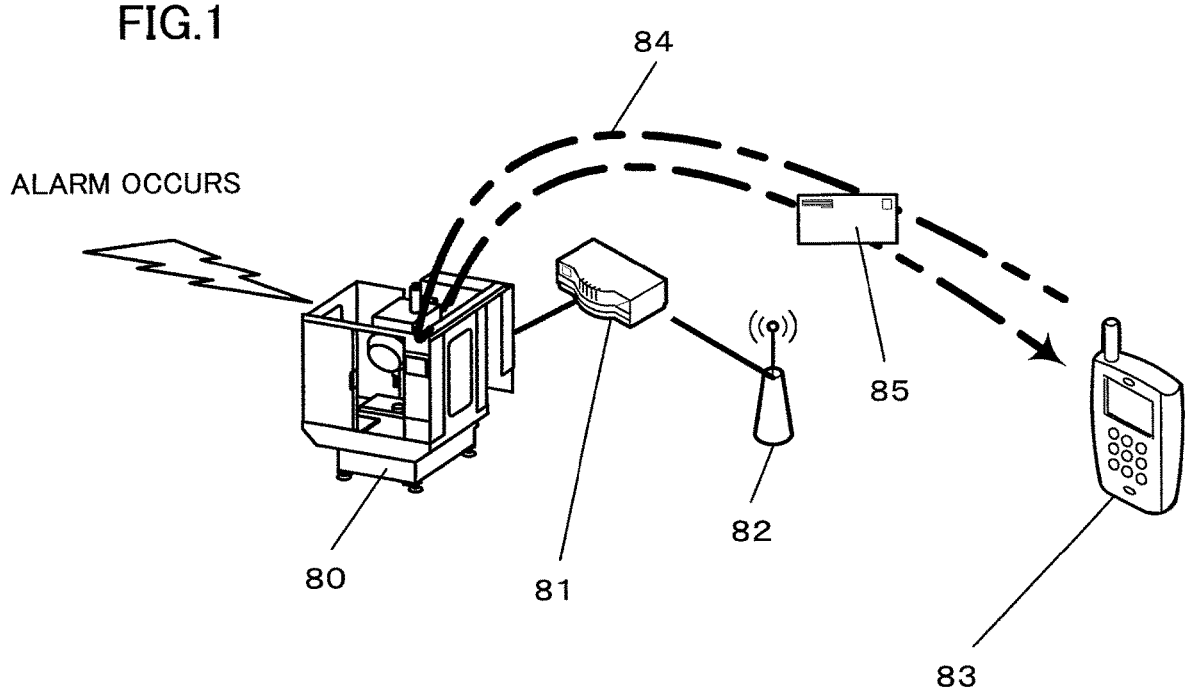
FIG. 1 is a diagram for describing a schematic configuration of a system in which one terminal receives an e-mail that contains event information.
Figure 2:
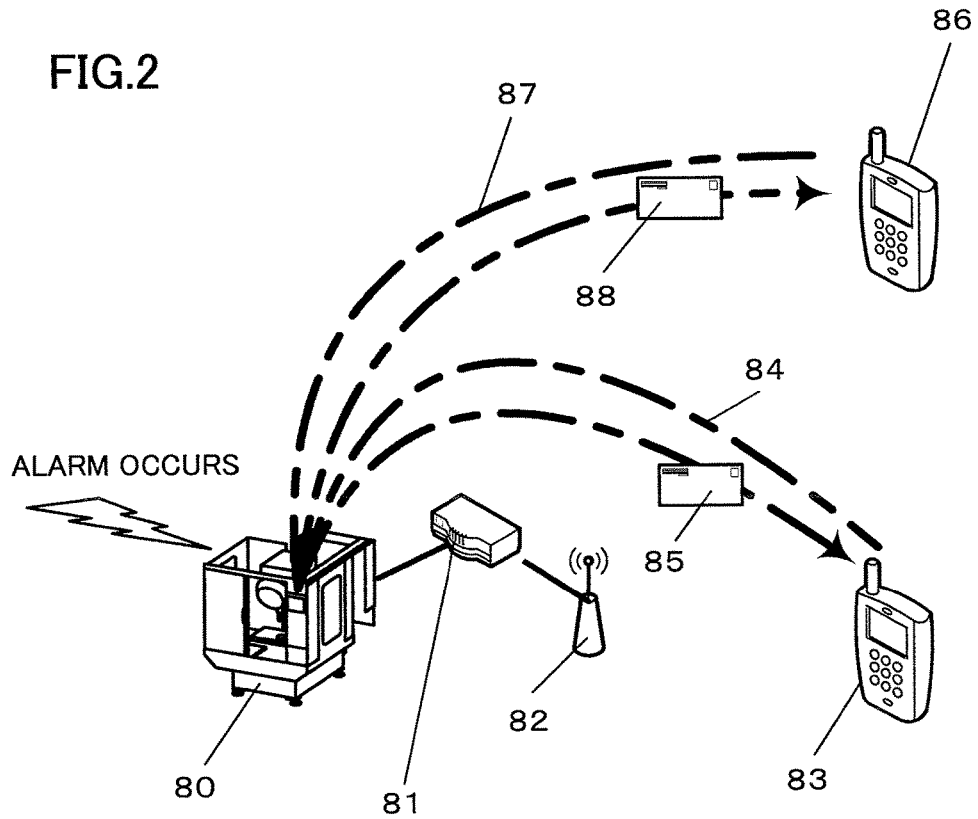
FIG. 2 is a diagram for describing a schematic configuration of a system in which a plurality of terminals receives an e-mail that contains event information.

A schematic configuration of a system according to the present invention will be described with reference to FIGS. 1 and 2. As illustrated in FIGS. 1 and 2, this system does not require a public network such as an Internet network for transmitting and receiving an e-mail or a mail server for delivering an e-mail.

FIG. 1 is a diagram for describing a schematic configuration of a system according to the present invention in which one terminal receives an e-mail that contains event information.

A controller (not illustrated) that controls a machine tool 80 has a function of transmitting information on the machine tool 80 or the controller to an e-mail reception mobile terminal 83 located at a distance from the controller via an e-mail. A router 81 has a function of determining a route through which an e-mail is to be transmitted.

The controller of the machine tool 80 composes an e-mail that contains event information such as alarm information (see FIG. 4), which will be described later. Upon receiving an e-mail acquisition request 84 from the e-mail reception mobile terminal 83 possessed by an operator who controls the machine tool 80, the controller of the machine tool 80 composes an e-mail and transmits the e-mail to the e-mail reception mobile terminal 83 (see e-mail reception 85). The transmission of the e-mail acquisition request 84 from the e-mail reception mobile terminal 83 to the controller of the machine tool 80 and the e-mail from the controller of the machine tool 80 to the e-mail reception mobile terminal 83 is performed by a wireless LAN device 82.

FIG. 2 is a diagram for describing a schematic configuration of a system according to the present invention in which a plurality of terminals receives an e-mail that contains event information. Although the system of FIG. 1 allows an e-mail to be transmitted to one e-mail reception mobile terminal 83 (a first e-mail reception mobile terminal), this system allows an e-mail to be transmitted to another e-mail reception mobile terminal 86 (a second e-mail reception mobile terminal).

The controller of the machine tool 80 transmits an e-mail to the e-mail reception mobile terminal 86 in response to an e-mail acquisition request 87 from the second e-mail reception mobile terminal 86. In this manner, the system of the present invention can transmit an e-mail to at least two e-mail reception mobile terminals in response to the e-mail acquisition requests from the e-mail reception mobile terminals.

In FIGS. 1 and 2, although the controller that transmits an e-mail to the e-mail reception mobile terminal is a controller that controls the machine tool 80, the controller may be a controller that controls an industrial machine, a controller that controls a robot, or a programmable logic controller.

In FIGS. 1 and 2, although the controller of the machine tool 80 is wirelessly connected to one (FIG. 1) or multiple (FIG. 2) e-mail reception mobile terminals by the wireless LAN device 82, the present invention is not limited to this connection, and the controller and the e-mail reception mobile terminal may be connected by cable. Further, the e-mail reception mobile terminal may be a desktop e-mail reception PC that is difficult to carry.

Figure 3:
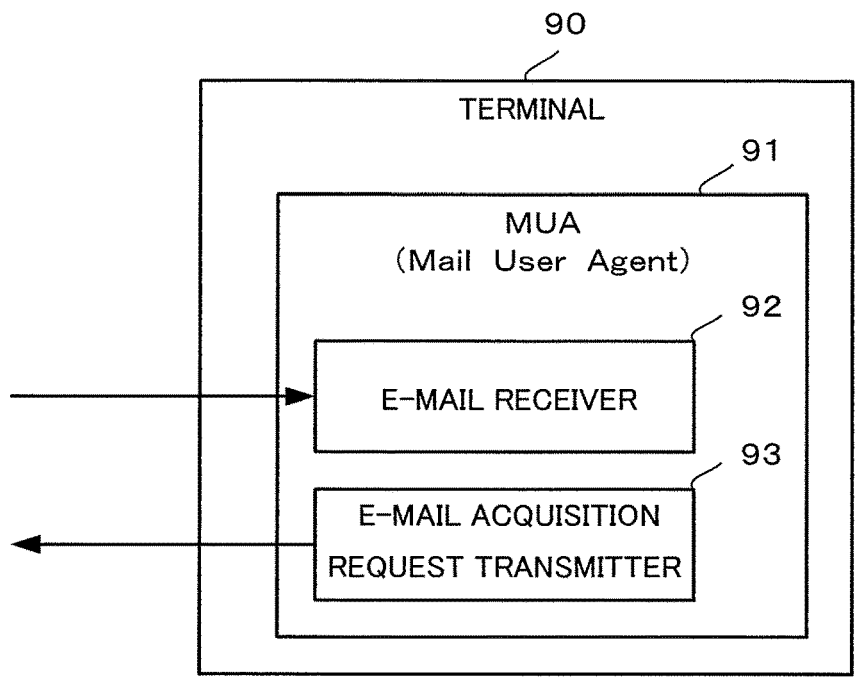
FIG. 3 is a diagram for describing an internal configuration of a terminal (e-mail reception mobile terminal)

FIG. 3 is a diagram for describing an internal configuration of an e-mail reception mobile terminal as a terminal.

Figure 19:
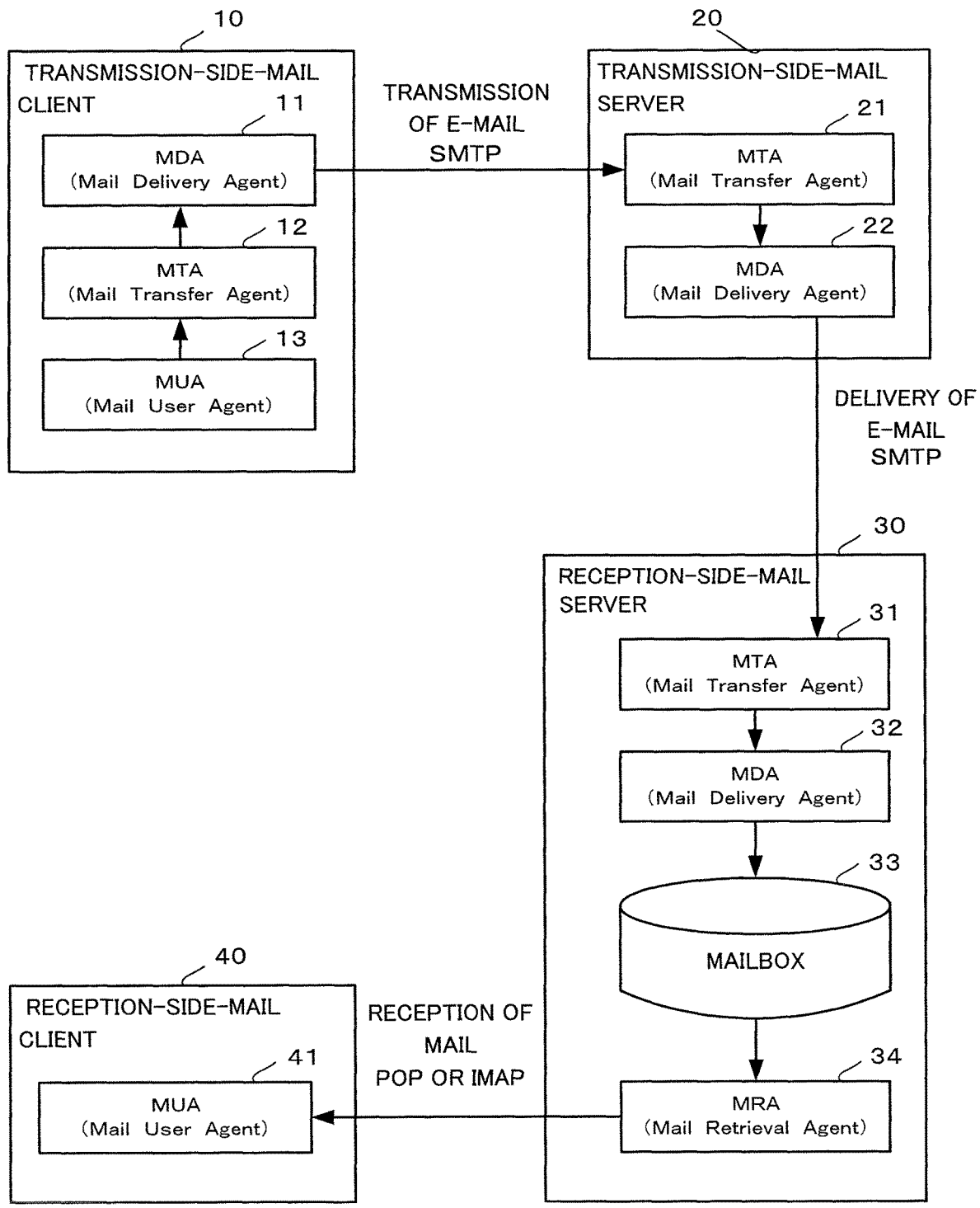
FIG. 19 is a diagram for describing a basic flow of an e-mail in an e-mail system.
Figure 20:
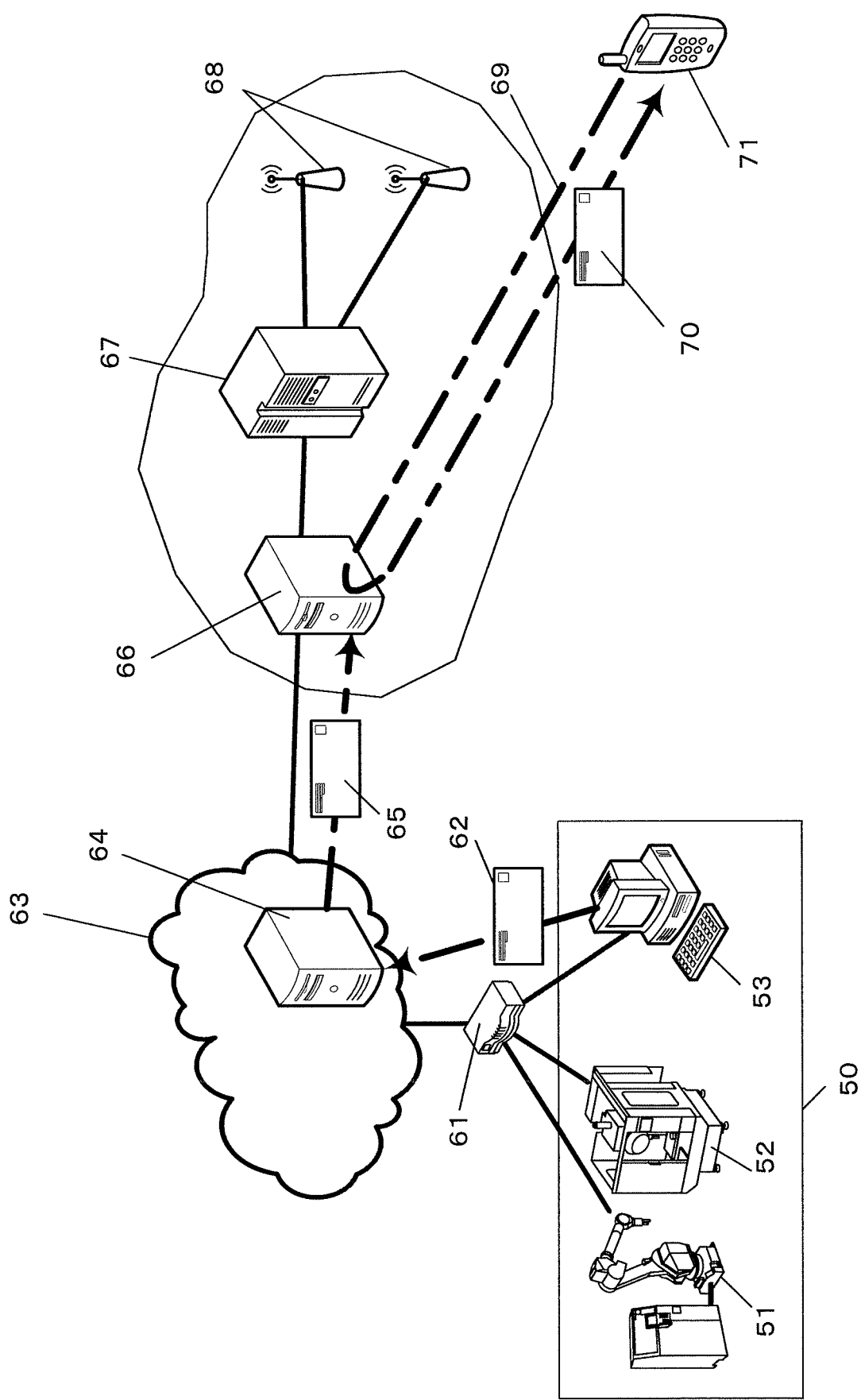
FIG. 20 is a diagram for describing a conventional e-mail system that uses a public network.
Figure 21:
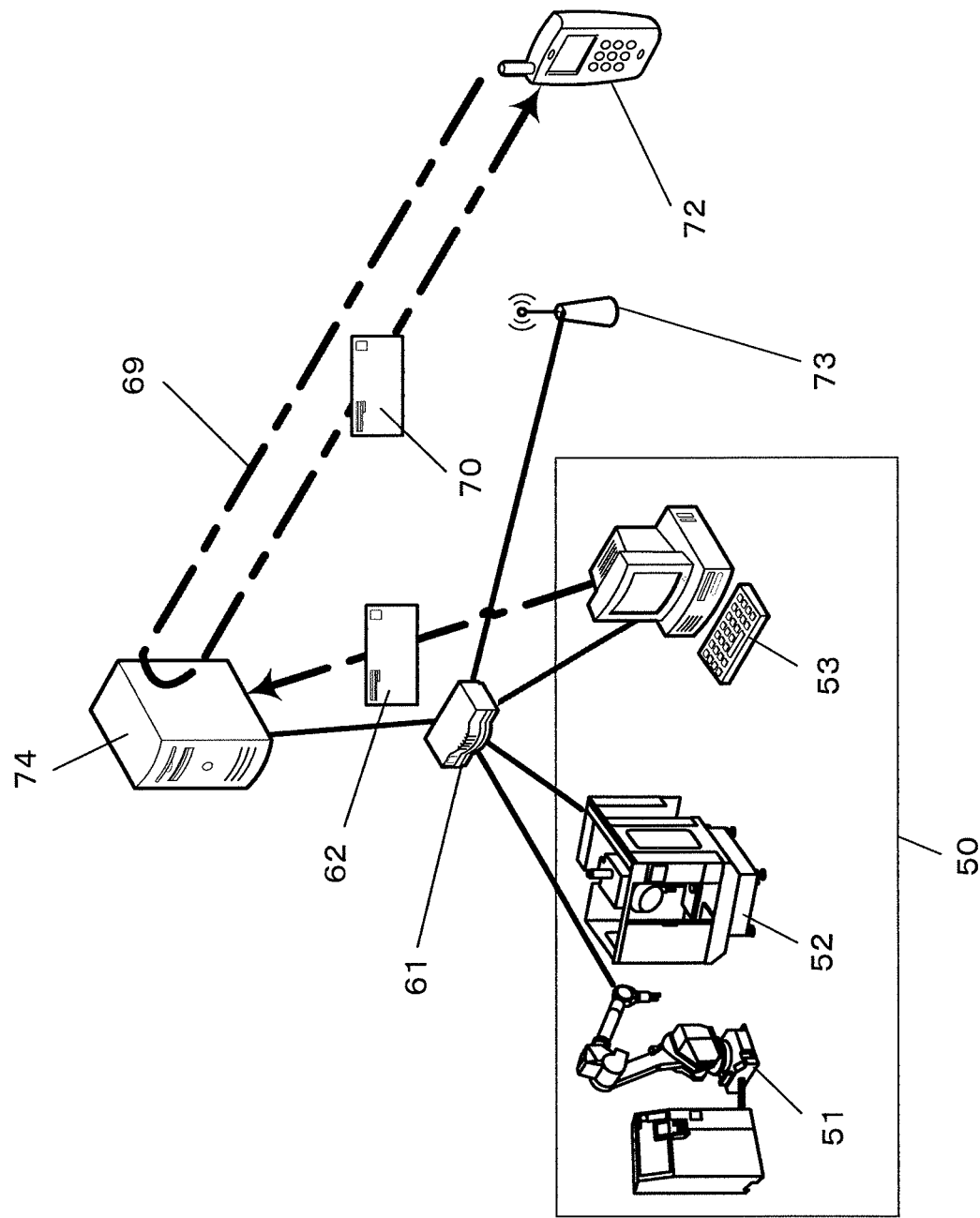
FIG. 21 is a diagram for describing a conventional e-mail system that does not use a public network.

A MUA 91 of the e-mail reception mobile terminal 83 of FIG. 1 and the e-mail reception mobile terminals 83 and 86 of FIG. 2 which are examples of a terminal includes an e-mail receiver 92 and an e-mail acquisition request transmitter 93. This MUA has been used in the conventional e-mail system as illustrated in FIGS. 19, 20, and 21.

Figure 4:
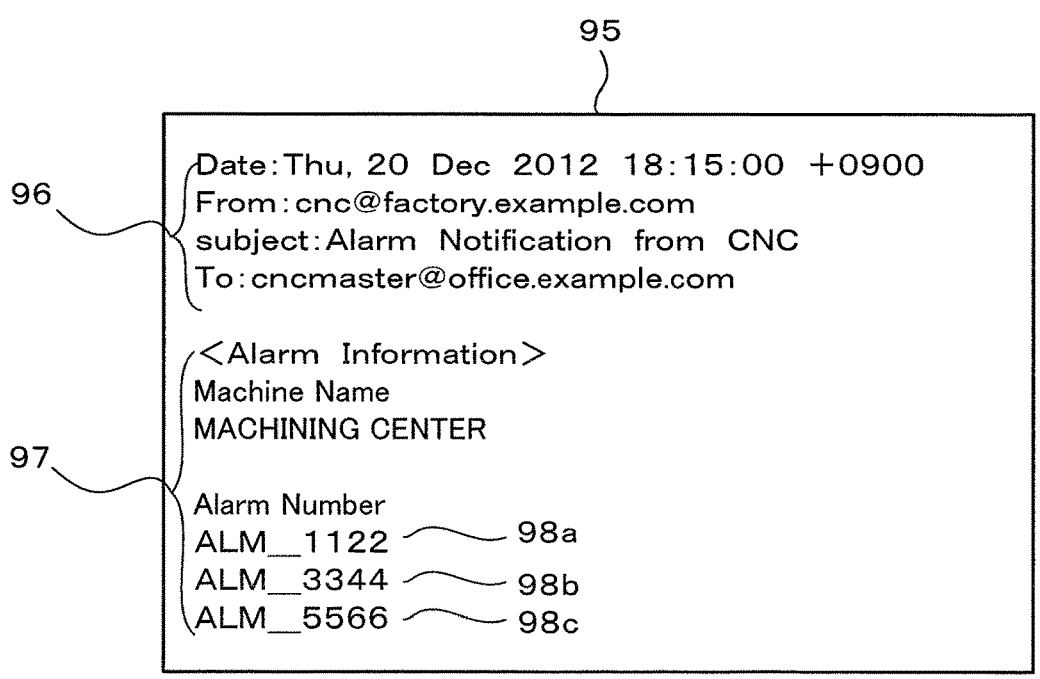
FIG. 4 is a diagram for describing an e-mail transmitted from a controller controlling a machine to a terminal (e-mail reception mobile terminal)

Here, in the system according to the present invention, the e-mail transmitted from the controller that controls a machine to a terminal (for example, the e-mail reception mobile terminals 83 and 86) will be described with reference to FIG. 4. FIG. 4 is a diagram for describing an example of an e-mail that contains event information that contains events that have occurred.

An e-mail 95 contains a header 96 that specifies a sender, a title of a mail, and a receiver and event information 97 such as alarm information. The event information 97 contains events 98a, 98b, and 98c that have occurred. In FIG. 4, <Alarm Information> is event information, and ALM_1122, ALM_3344, and ALM_5566 are events that have occurred.

Hereinafter, embodiments of the controller according to the present invention will be described.

First Embodiment

Figure 5:
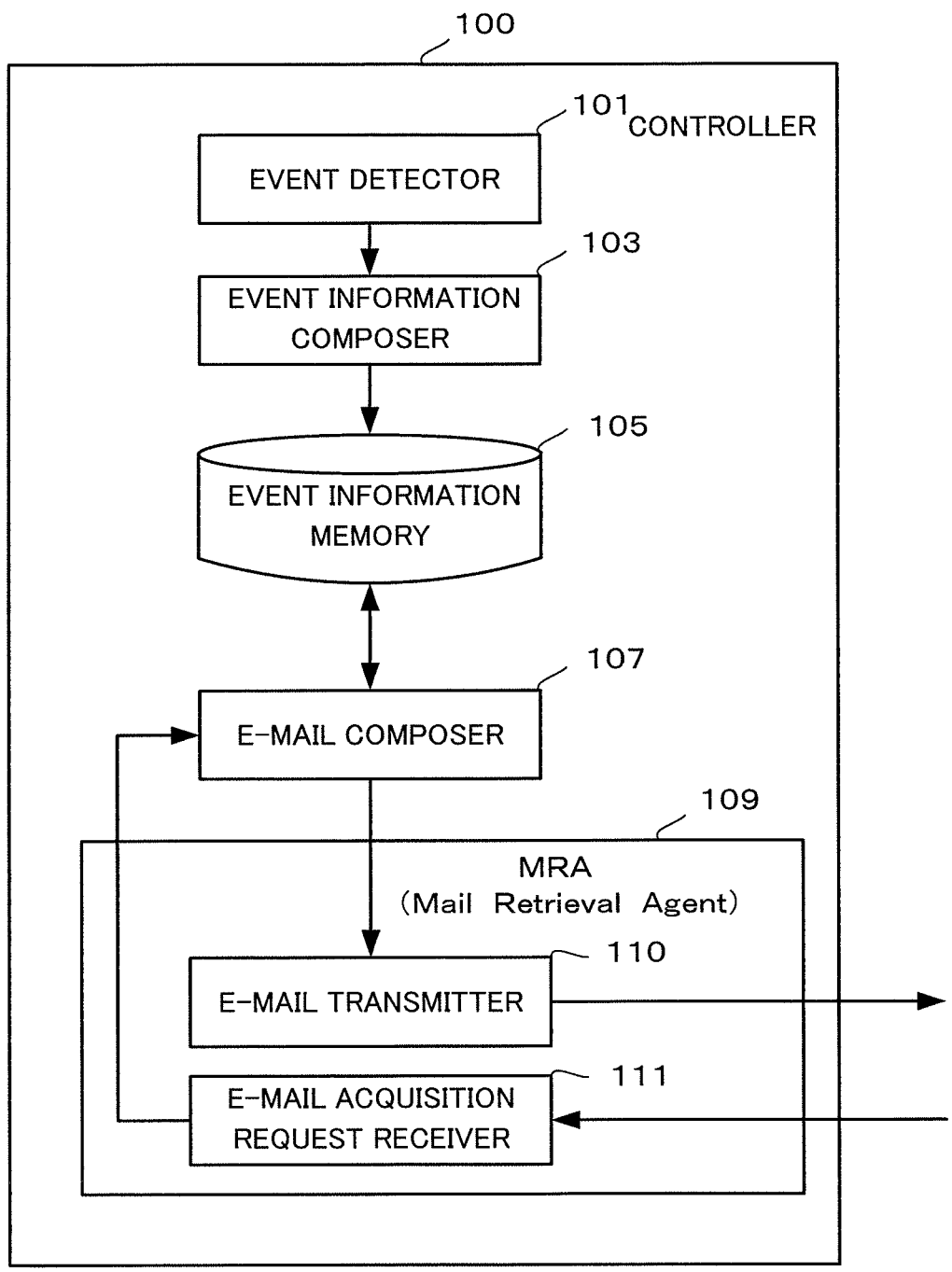
FIG. 5 is a diagram for describing an internal configuration of a first embodiment of a controller according to the present invention.

FIG. 5 is a diagram for describing an internal configuration of a first embodiment of the controller. In this embodiment, a controller that controls a machine tool or an industrial machine, a controller that controls a robot, and a programmable logic controller will be collectively referred to as a "machine controller 100" or simply to as a "controller 100". The same is applied to the other embodiments. This machine controller 100 generally includes a processor (CPU), a memory, and a communication interface.

The controller 100 has a function of transmitting information on the controller 100 or a machine controlled by the controller 100 to a terminal (the e-mail reception mobile terminals 83 and 86 illustrated in FIGS. 1 and 2) located at a distance from the controller 100. The controller 100 includes an event detector 101 that detects an event that has occurred in the controller 100 or the machine controlled by the controller 100, an event information composer 103 that composes event information containing at least one event that has occurred in the controller 100 or the machine controlled by the controller 100, an event information memory 105 that stores the event information composed by the event information composer 103, an e-mail acquisition request receiver 111 that receives an e-mail acquisition request from a terminal, an e-mail composer 107 that acquires the event information stored in the event information memory 105 based on the e-mail acquisition request and composes an e-mail that contains the acquired event information, and an e-mail transmitter 110 that transmits the e-mail containing the event information, composed by the e-mail composer 107, directly to the terminal. The e-mail transmitter 110 and the e-mail acquisition request receiver 111 form the MRA 109. The MRA 109 has been used in a conventional e-mail system as described with reference to FIG. 19.

The e-mail illustrated in FIG. 4 will be described as an example. When the event detector 101 detects the occurrence of an abnormality in the machine or the machine controller 100 (that is, ALM_1122, for example, is detected in the controller 100), the event information composer 103 composes event information that contains an event that has occurred. The event information composer 103 stores the composed event information in the event information memory 105. Upon receiving an instruction from the e-mail acquisition request receiver 111 of the MRA 109, the e-mail composer 107 reads the event information stored in the event information memory 105, composes an e-mail, and transmits the e-mail to the e-mail transmitter 110 of the MRA 109. The e-mail transmitter 110 transmits the composed e-mail directly to the terminal that sent the e-mail acquisition request to the controller 100.

Second Embodiment

Figure 6:
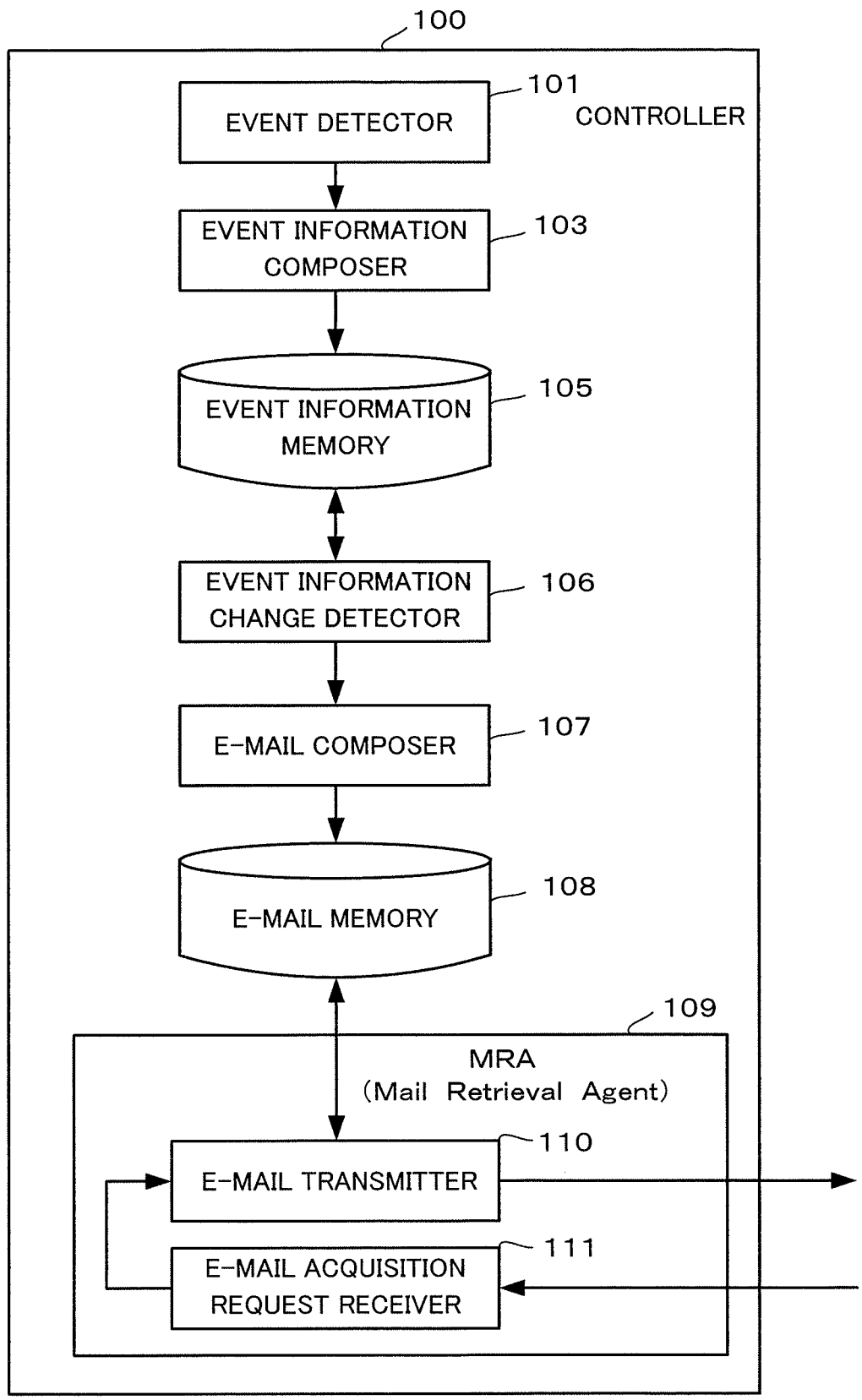
FIG. 6 is a diagram for describing an internal configuration of a second embodiment of a controller according to the present invention.

FIG. 6 is a diagram for describing an internal configuration of a second embodiment of the controller.

The controller 100 has a function of transmitting information on the controller 100 or a machine controlled by the controller 100 to a terminal (the e-mail reception mobile terminals 83 and 86 illustrated in FIGS. 1 and 2) located at a distance from the controller 100. The controller 100 includes an event detector 101 that detects an event that has occurred in the controller 100 or the machine controlled by the controller 100, an event information composer 103 that composes event information containing at least one event that has occurred in the controller 100 or the machine controlled by the controller 100, an event information memory 105 that stores the event information composed by the event information composer 103, an event information change detector 106 that detects a change in the event information stored in the event information memory 105, an e-mail composer 107 that acquires the event information stored in the event information memory 105 when the event information change detector 106 has detected a change in the event information and composes an e-mail that contains the event information, an e-mail memory 108 that stores the composed e-mail, an e-mail acquisition request receiver 111 that receives an e-mail acquisition request from a terminal, and an e-mail transmitter 110 that transmits the e-mail containing the event information, stored in the e-mail memory 108, based on the received e-mail acquisition request directly to the terminal. The e-mail transmitter 110 and the e-mail acquisition request receiver 111 form the MRA 109.

Third Embodiment

Figure 7:
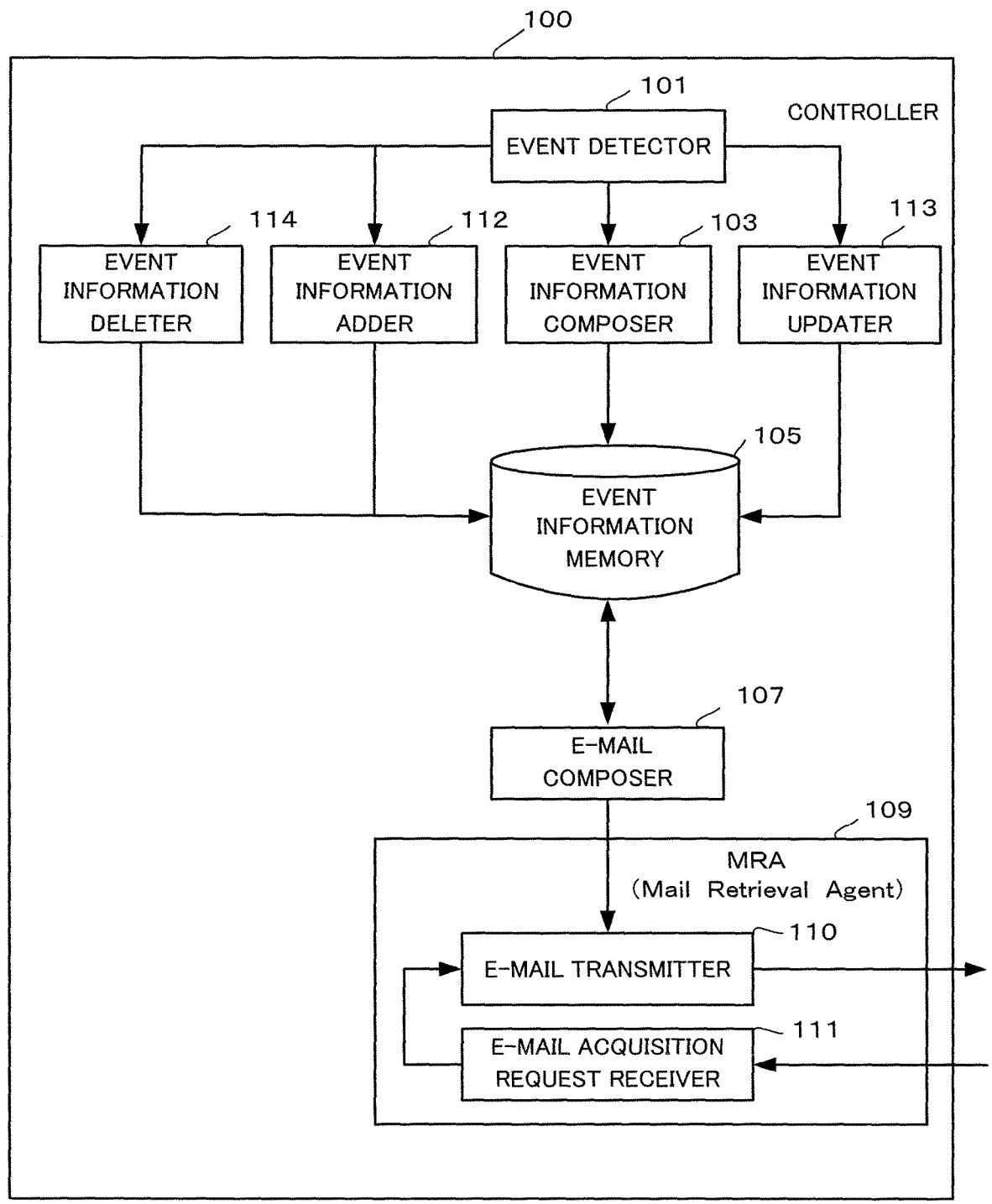
FIG. 7 is a diagram for describing an internal configuration of a third embodiment of a controller according to the present invention.

FIG. 7 is a diagram for describing an internal configuration of a third embodiment of the controller.

The controller 100 has a function of transmitting information on the controller 100 or a machine controlled by the controller 100 to a terminal (the e-mail reception mobile terminals 83 and 86 illustrated in FIGS. 1 and 2) located at a distance from the controller 100. The controller 100 includes an event detector 101 that detects an event that has occurred in the controller 100 or the machine controlled by the controller 100, an event information composer 103 that composes event information containing at least one event that has occurred in the controller 100 or the machine controlled by the controller 100, an event information memory 105 that stores the event information composed by the event information composer 103, an e-mail acquisition request receiver 111 that receives an e-mail acquisition request from a terminal, an e-mail composer 107 that acquires the event information stored in the event information memory 105 based on the e-mail acquisition request and composes an e-mail that contains the acquired event information, and an e-mail transmitter 110 that transmits the e-mail containing the event information, composed by the e-mail composer 107, directly to the terminal. The controller 100 further includes an event information adder 112 that, when a new event occurs after the event information is composed, adds the event to the event information stored in the event information memory 105, an event information updater 113 that updates the event contained in the event information stored in the event information memory 105 when the event contained in the event information stored in the event information memory 105 is changed after the event information is composed, and an event information deleter 114 that deletes the event from the event information stored in the event information memory 105 when the event is canceled after the event information is composed.

The controller 100 of this embodiment may include at least one of the event information adder 112, the event information updater 113, and the event information deleter 114 rather than including all of these components.

Fourth Embodiment

Figure 8:
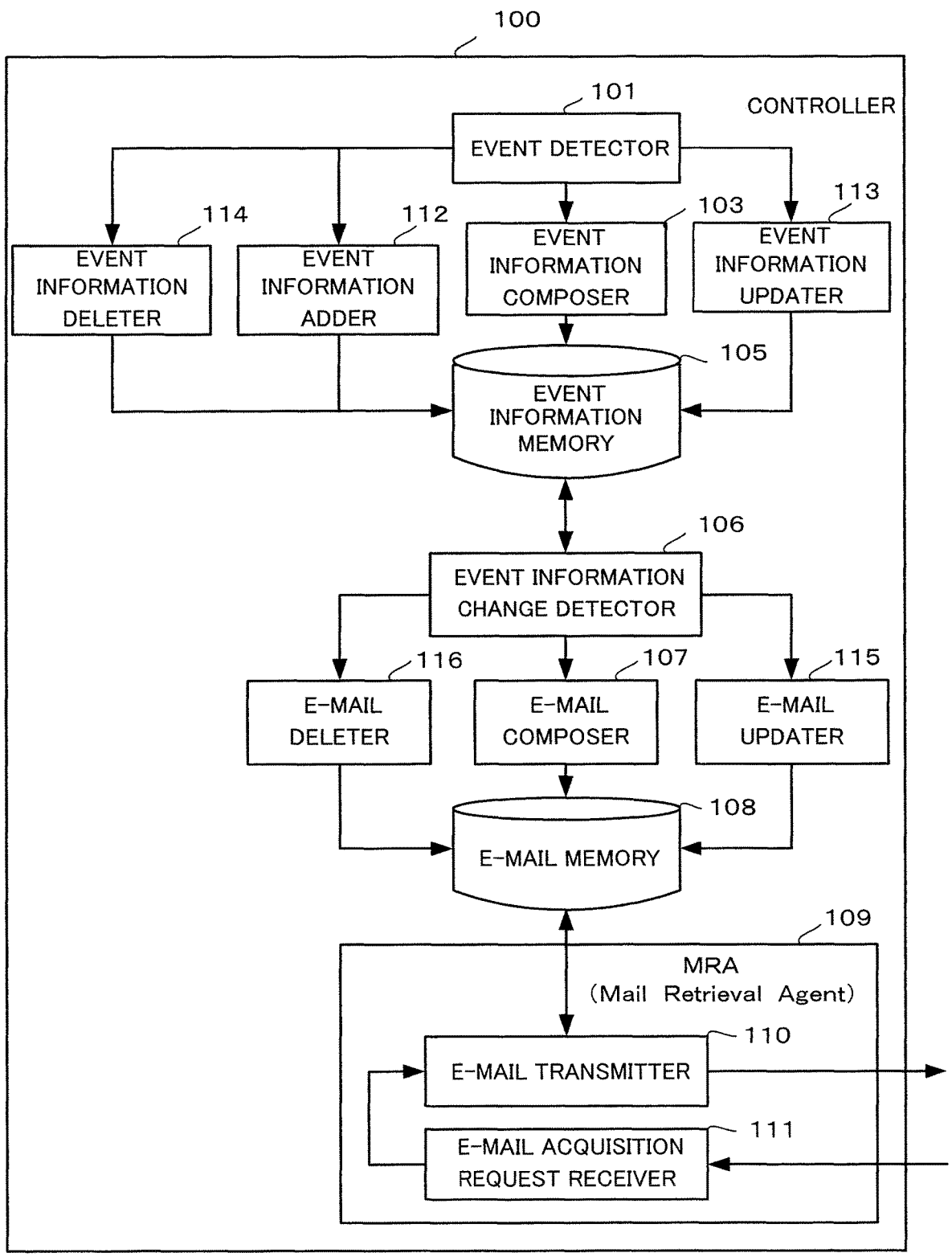
FIG. 8 is a diagram for describing an internal configuration of a fourth embodiment of a controller according to the present invention.

FIG. 8 is a diagram for describing an internal configuration of a fourth embodiment of the controller.

The controller 100 has a function of transmitting information on the controller 100 or a machine controlled by the controller 100 to a terminal (the e-mail reception mobile terminals 83 and 86 illustrated in FIGS. 1 and 2) located at a distance from the controller 100. The controller 100 includes an event detector 101 that detects an event that has occurred in the controller 100 or the machine controlled by the controller 100, an event information composer 103 that composes event information containing at least one event that has occurred in the controller 100 or the machine controlled by the controller 100, an event information memory 105 that stores the event information composed by the event information composer 103, an event information change detector 106 that detects a change in the event information stored in the event information memory 105, an e-mail composer 107 that acquires the event information stored in the event information memory 105 when the event information change detector 106 has detected a change in the event information and composes an e-mail that contains the event information, an e-mail memory 108 that stores the composed e-mail, an e-mail acquisition request receiver 111 that receives an e-mail acquisition request from a terminal, and an e-mail transmitter 110 that transmits the e-mail containing the event information, stored in the e-mail memory 108, based on the received e-mail acquisition request directly to the terminal. The controller 100 further includes an event information adder 112 that, when a new event occurs after the event information is composed, adds the event to the event information stored in the event information memory 105, an event information updater 113 that updates the event contained in the event information stored in the event information memory 105 when the event contained in the event information stored in the event information memory 105 is changed after the event information is composed, and an event information deleter 114 that deletes the event from the event information stored in the event information memory 105 when the event is canceled after the event information is composed.

The controller 100 of this embodiment may include at least one of the event information adder 112, the event information updater 113, and the event information deleter 114 rather than including all of these components.

The controller 100 further includes an e-mail updater 115 that updates the event information contained in the e-mail composed by the e-mail composer 107 when a new event occurs after the event information is composed and the event information change detector 106 has detected that the event is added to the event information or when the event information change detector 106 has detected a change in the event contained in the event information after the event information is composed, and an e-mail deleter 116 that, when the event information change detector 106 has detected that at least one event has been canceled after the event information is composed, deletes this event of the event information contained in the e-mail composed by the e-mail composer 107, and that deletes the e-mail composed by the e-mail composer 107 when the event information change detector 106 has detected that all events have been canceled after the event information is composed.

The controller 100 of this embodiment may include at least one of the e-mail updater 115 and the e-mail deleter 116 rather than including both of these components.

Figure 9:
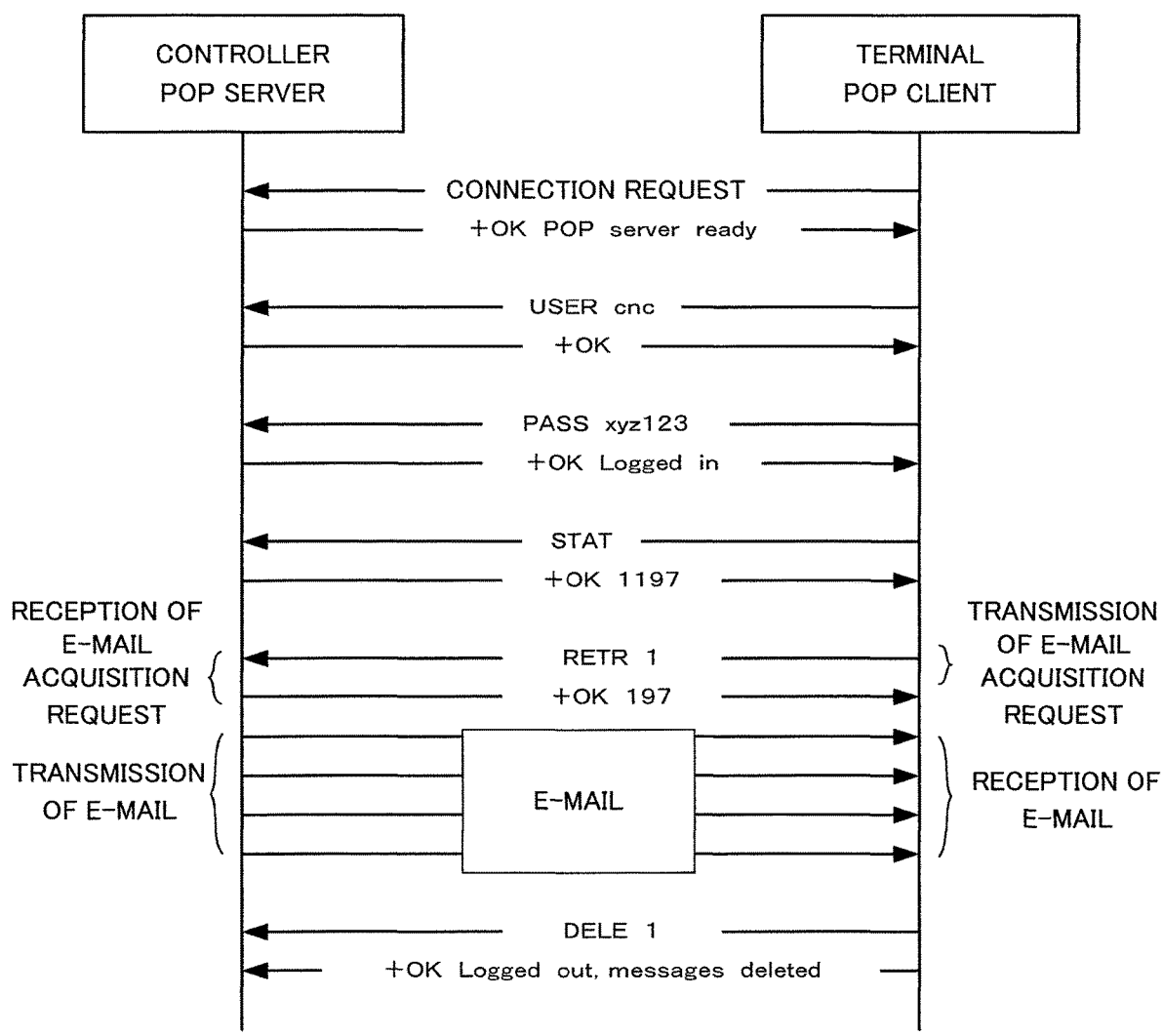
FIG. 9 is a diagram for describing an example of a communication sequence of transmitting an e-mail from a controller (POP server) to a terminal (POP client)
Figure 10:
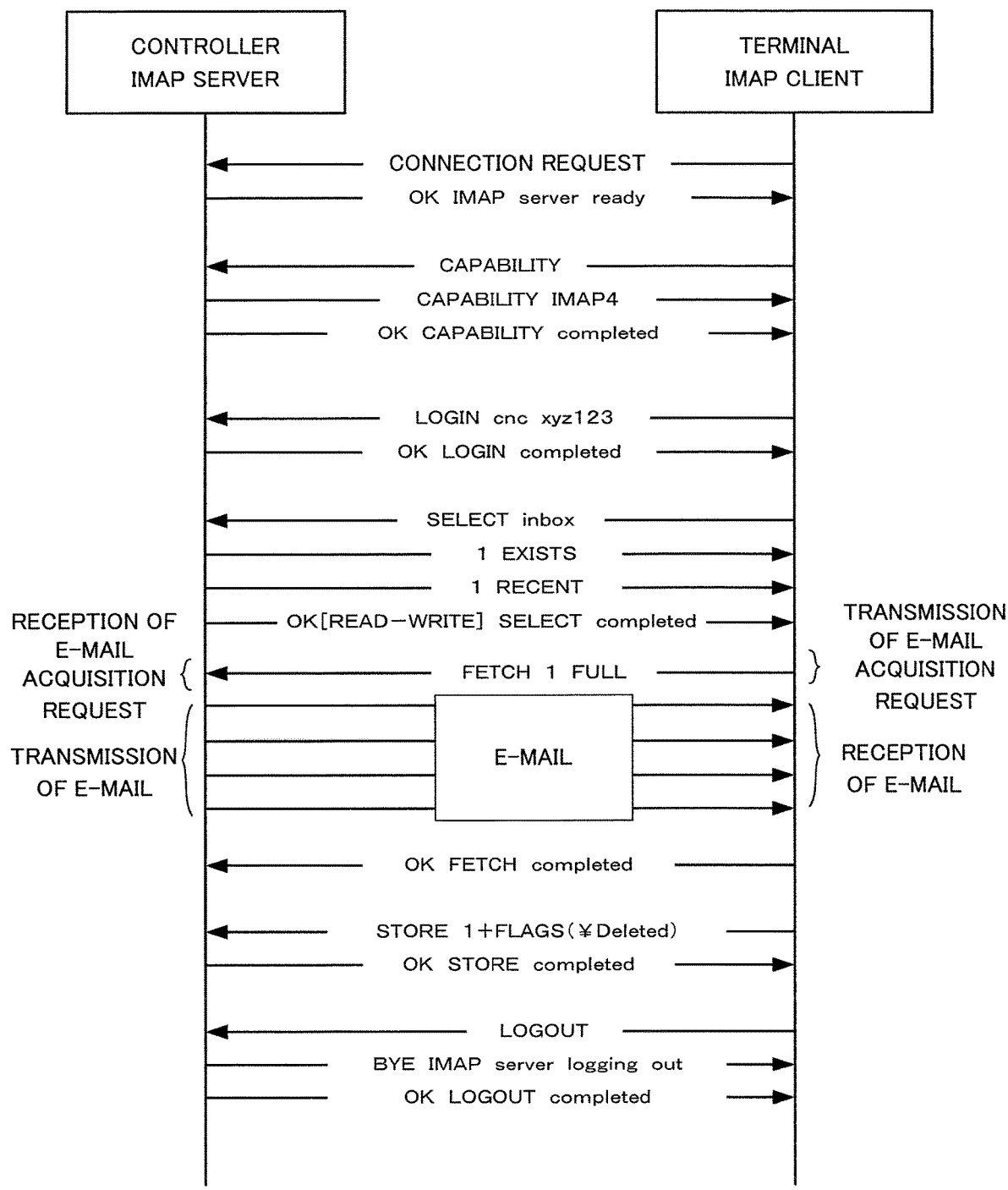
FIG. 10 is a diagram for describing an example of a communication sequence of transmitting an e-mail from a controller (IMAP server) to a terminal (IMAP client)

In the respective embodiments, the controller 100 transmits an e-mail to a terminal according to the protocol (POP or IMAP) as illustrated in FIG. 19. FIG. 9 is a diagram for describing an example of the communication sequence of transmitting an e-mail from the controller 100 which is a POP server to a terminal which is a POP client. FIG. 10 is a diagram for describing an example of the communication sequence of transmitting an e-mail from the controller 100 which is an IMAP server to a terminal which is an IMAP client. The e-mail illustrated in FIG. 4, for example, is transmitted from the controller 100 which is a POP server to a terminal.

Hereinafter, the processes executed by the respective embodiments of the controller will be described with reference to flowcharts.

Figure 11:
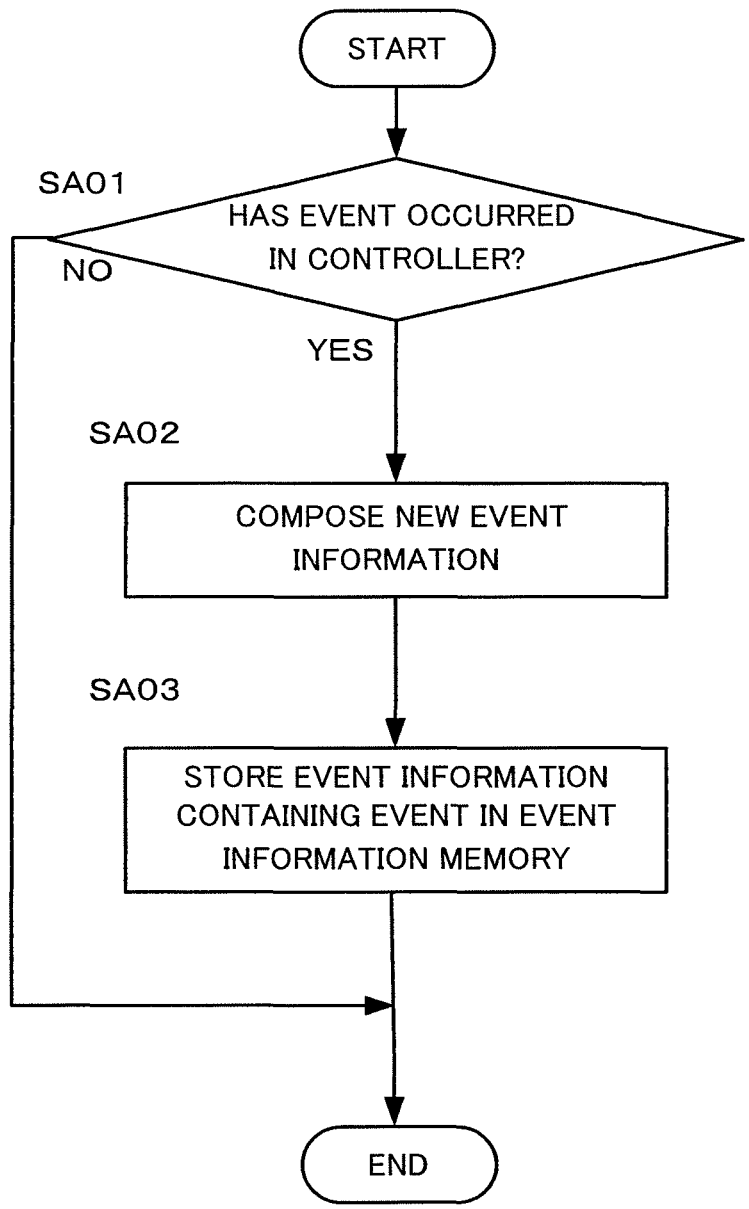
FIG. 11 is a flowchart illustrating the processes executed by an event detector and an event information composer illustrated in FIGS. 5 and 6 when an event occurs.

FIG. 11 is a flowchart illustrating the processes executed by the event detector and the event information composer of the first embodiment (FIG. 5) and the second embodiment (FIG. 6) of the controller when an event occurs. The processes executed will be described according to the respective steps.

In step SA01, the controller determines whether an event has occurred or not. When an event has occurred (YES), the flow proceeds to step SA02. When an event has not occurred (NO), this process ends.

In step SA02, new event information is composed.

In step SA03, the event information that contains an event is stored in the event information memory, and this process ends.

Figure 12:
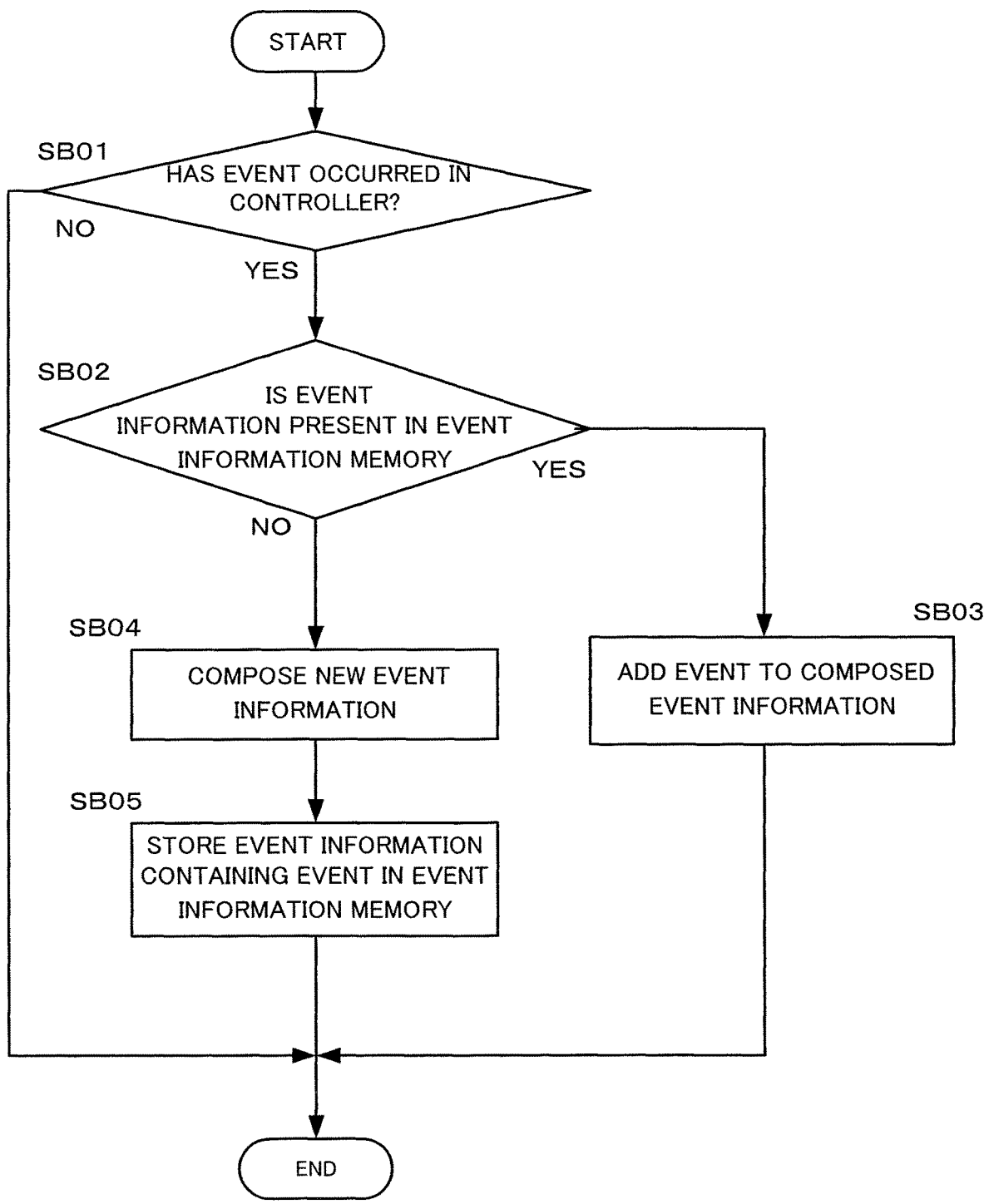
FIG. 12 is a flowchart illustrating the processes executed by an event detector, an event information composer, and an event information adder illustrated in FIGS. 7 and 8 when an event occurs.

FIG. 12 is a flowchart illustrating the processes executed by the event detector, the event information composer, and the event information adder of the third embodiment (FIG. 7) and the fourth embodiment (FIG. 8) of the controller when an event occurs. The processes executed will be described according to the respective steps.

In step SB01, the controller determines whether an event has occurred or not. When an event has occurred (YES), the flow proceeds to step SB02. When an event has not occurred (NO), this process ends.

In step SB02, it is determined whether or not event information is present in the event information memory. When the event information is present (YES), the flow proceeds to step SB03. When the event information is not present (NO), the flow proceeds to step SB04.

In step SB03, an event is added to the composed event information, and this process ends.

In step SB04, new event information is composed.

In step SB05, the event information containing an event is stored in the event information memory, and this process ends.

Figure 13:
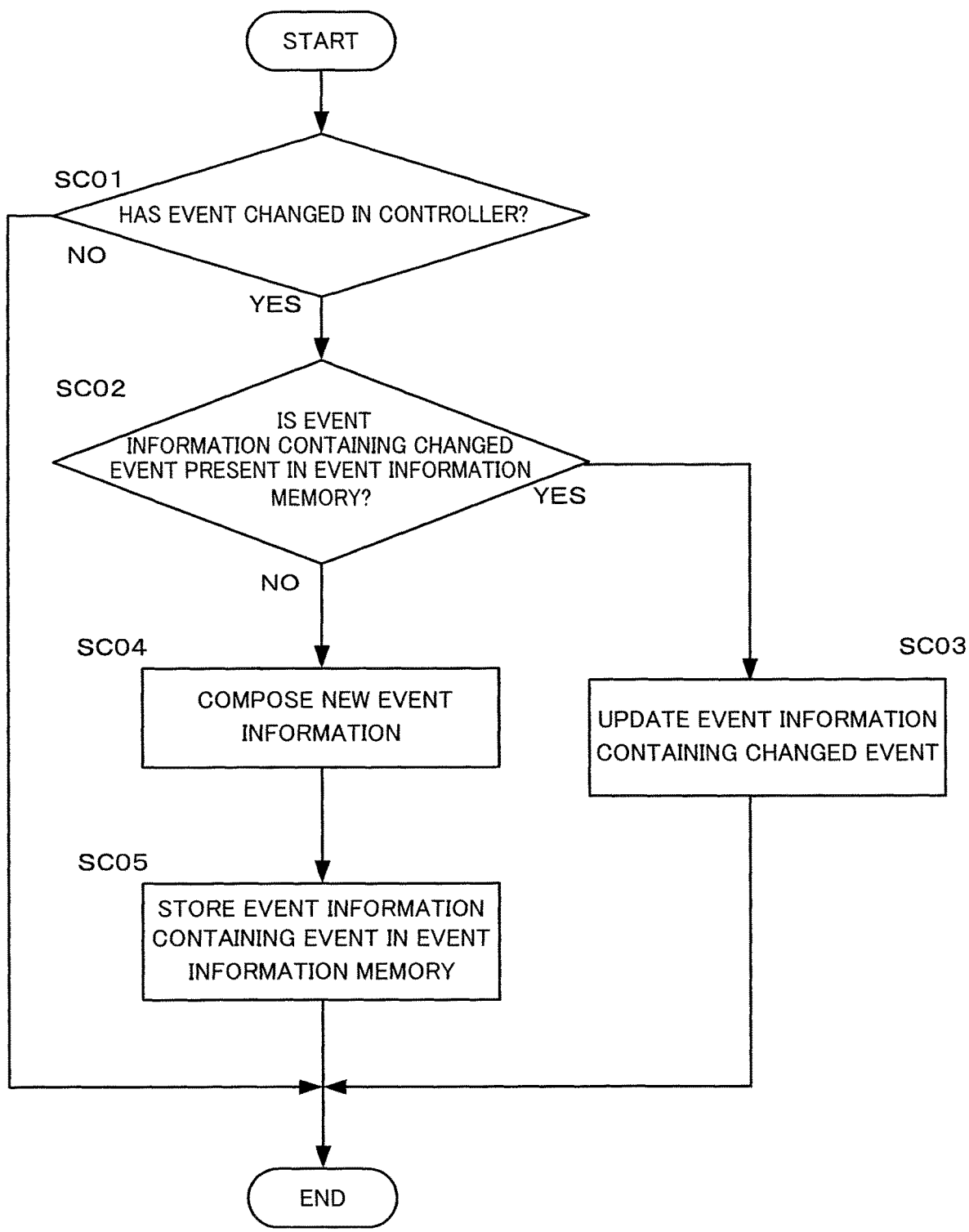
FIG. 13 is a flowchart illustrating the processes executed by an event detector, an event information composer, and an event information updater illustrated in FIGS. 7 and 8 when an event is changed.

FIG. 13 is a flowchart illustrating the processes executed by the event detector, the event information composer, and the event information updater of the third embodiment (FIG. 7) and the fourth embodiment (FIG. 8) of the controller when an event is changed. The processes executed will be described according to the respective steps.

In step SC01, the controller determines whether an event has occurred or not. When an event has occurred (YES), the flow proceeds to step SC02. When an event has not occurred (NO), this process ends.

In step SC02, it is determined whether or not event information that contains a changed event is present in the event information memory. When the event information is present (YES), the flow proceeds to step SC03. When the event information is not present (NO), the flow proceeds to step SC04.

In step SC03, the event information containing the changed event is updated, and this process ends.

In step SC04, new event information is composed.

In step SC05, the event information containing an event is stored in the event information memory, and this process ends.

Figure 14:
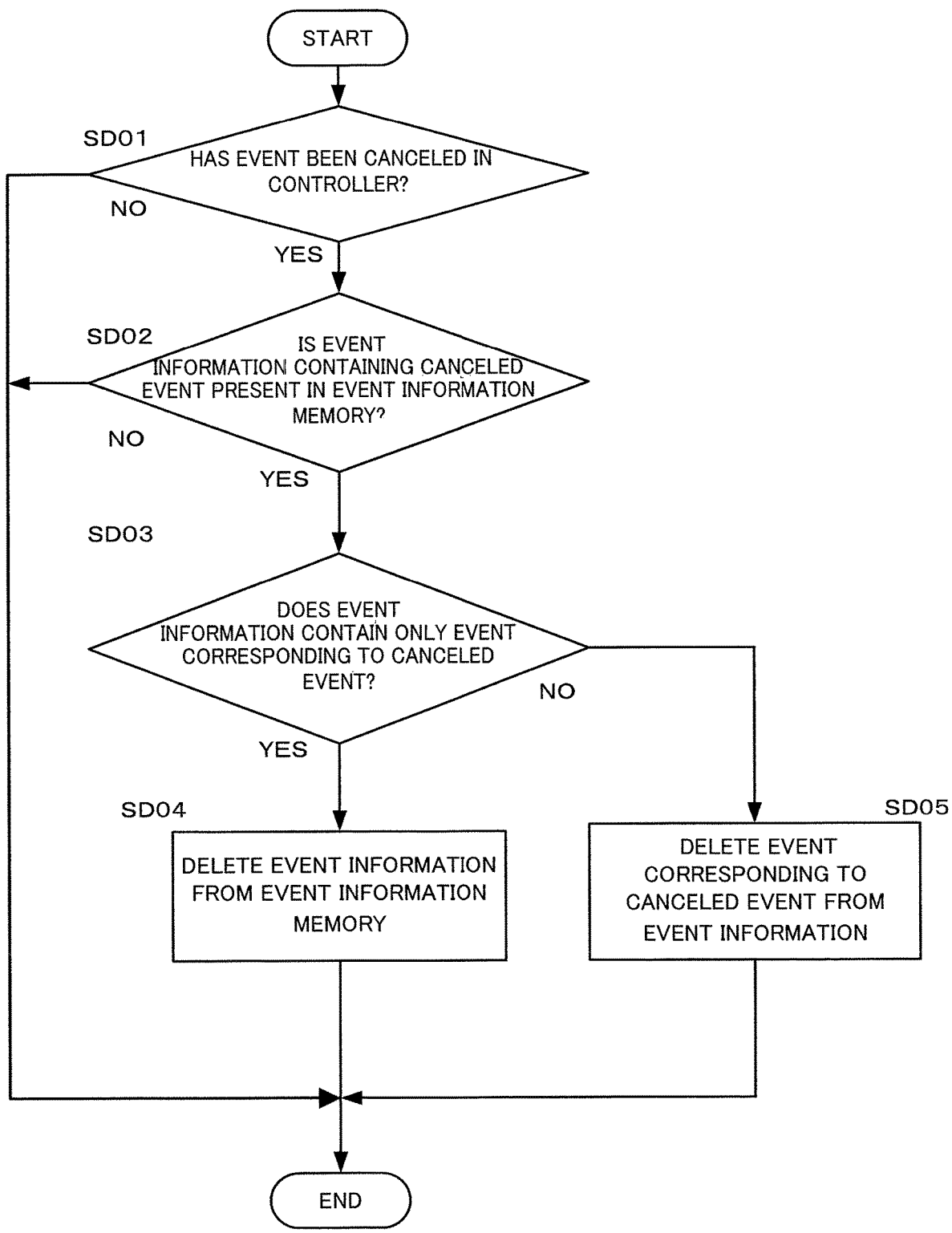
FIG. 14 is a flowchart illustrating the processes executed by an event detector and an event information deleter illustrated in FIGS. 7 and 8 when an event is cleared.

FIG. 14 is a flowchart illustrating the processes executed by the event detector and the event information deleter of the third embodiment (FIG. 7) and the fourth embodiment (FIG. 8) of the controller when an event is canceled. The processes executed will be described according to the respective steps.

In step SD01, the controller determines whether an event is canceled or not. When the event is canceled (YES), the flow proceeds to step SD02. When the event is not canceled (NO), this process ends.

In step SD02, it is determined whether or not event information that contains a canceled event is present in the event information memory. When the event information is present (YES), the flow proceeds to step SD03. When the event information is not present (NO), this process ends.

In step SD03, it is determined whether or not the event information is event information that contains only an event corresponding to the canceled event. When the event information is event information that contains only the event corresponding to the canceled event (YES), the flow proceeds to step SD04. When the event information is not the event information that contains only the event corresponding to the canceled event (NO), the flow proceeds to step SD05.

In step SD04, the event information is deleted from the event information memory, and this process ends.

In step SD05, the event corresponding to the canceled event is deleted from the event information, and this process ends.

Figure 15:
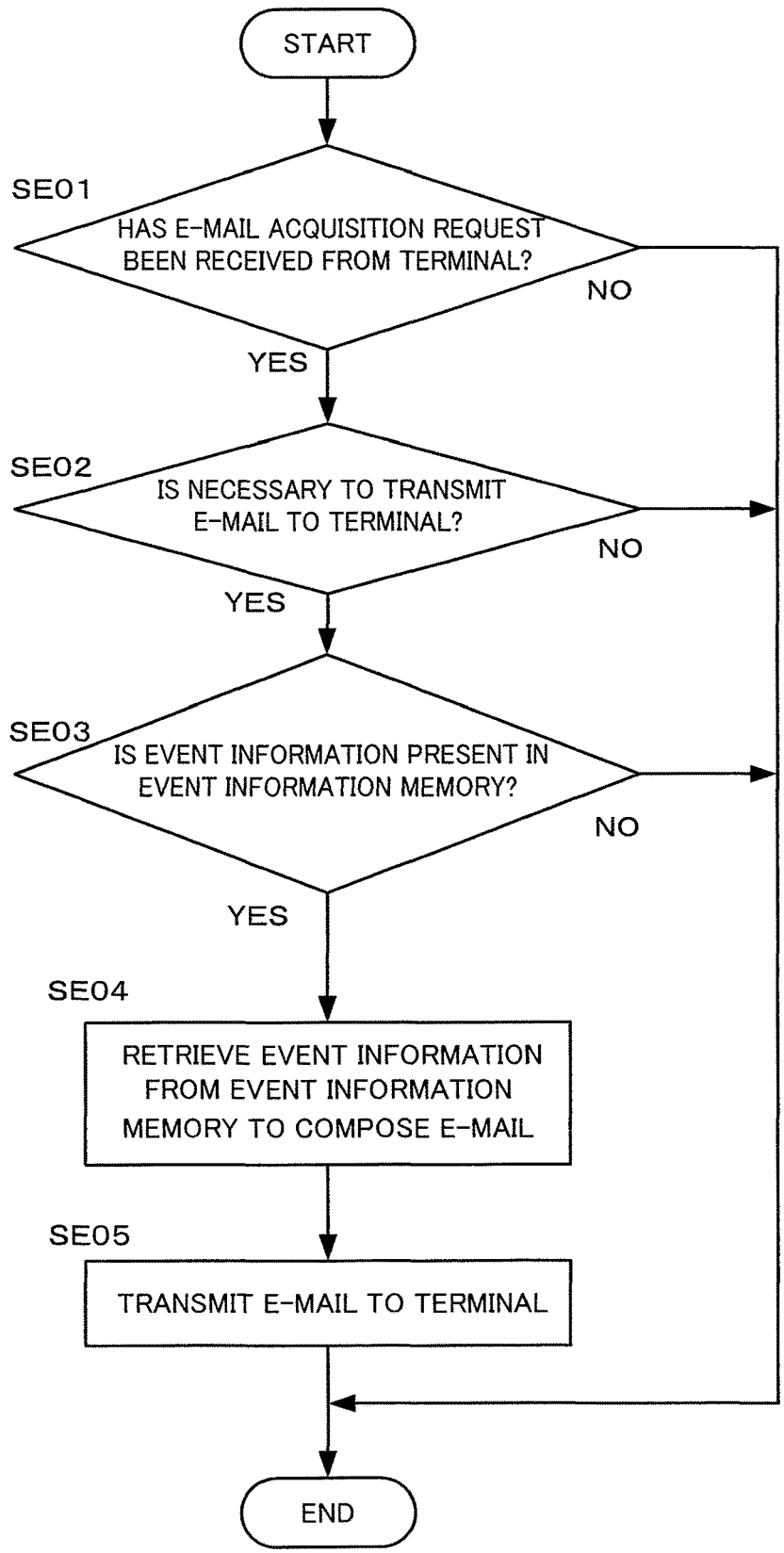
FIG. 15 is a flowchart illustrating the processes executed by an e-mail acquisition request receiver, an e-mail transmitter, and an e-mail composer illustrated in FIGS. 5 and 7.

FIG. 15 is a flowchart illustrating the processes executed by the e-mail acquisition request receiver, the e-mail transmitter, and the e-mail composer of the first embodiment (FIG. 5) and the third embodiment (FIG. 7) of the controller. The processes executed will be described according to the respective steps.

In step SE01, it is determined whether or not an e-mail acquisition request is received from a terminal. When the e-mail acquisition request is received (YES), the flow proceeds to step SE02. When the e-mail acquisition request is not received (NO), this process ends.

In step SE02, it is determined whether or not it is necessary to transmit an e-mail to a terminal. When it is necessary to transmit the e-mail (YES), the flow proceeds to step SE03. When it is not necessary to transmit the e-mail (YES), this process ends.

In step SE03, it is determined whether or not the event information is present in the event information memory. When the event information is present (YES), the flow proceeds to step SE04. When the event information is not present (NO), this process ends.

In step SE04, the event information is retrieved from the event information memory and an e-mail is composed.

In step SE05, the e-mail is transmitted to the terminal, and this process ends.

Figure 16:
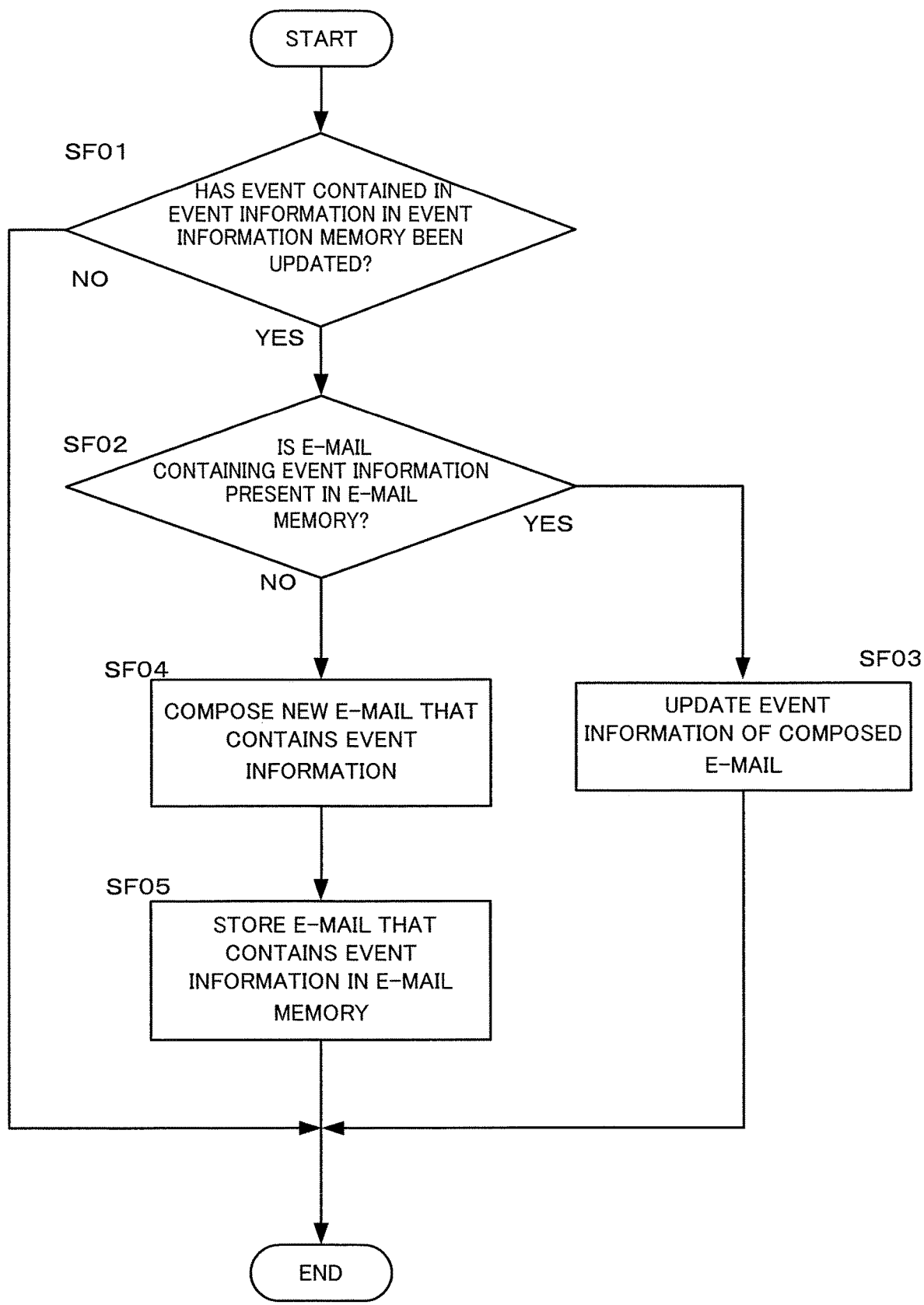
FIG. 16 is a flowchart illustrating the processes executed by an event information detector, an e-mail composer, and an e-mail updater illustrated in FIG. 8.

FIG. 16 is a flowchart illustrating the processes executed by the event information detector, the e-mail composer, and the e-mail updater of the fourth embodiment (FIG. 8) of the controller. The processes executed will be described according to the respective steps.

In step SF01, it is determined whether or not an event contained in the event information in the event information memory is updated. When the event is updated (YES), the flow proceeds to step SF02. When the event is not updated (NO), this process ends.

In step SF02, it is determined whether or not an e-mail that contains the event information is present in the e-mail memory. When the e-mail is present (YES), the flow proceeds to step SF03. When the e-mail is not present (NO), the flow proceeds to step SF04.

In step SF03, the event information of the composed e-mail is updated, and this process ends.

In step SF04, a new e-mail that contains the event information is composed.

In step SF05, the e-mail that contains the event information is stored in the e-mail memory, and this process ends.

Figure 17:
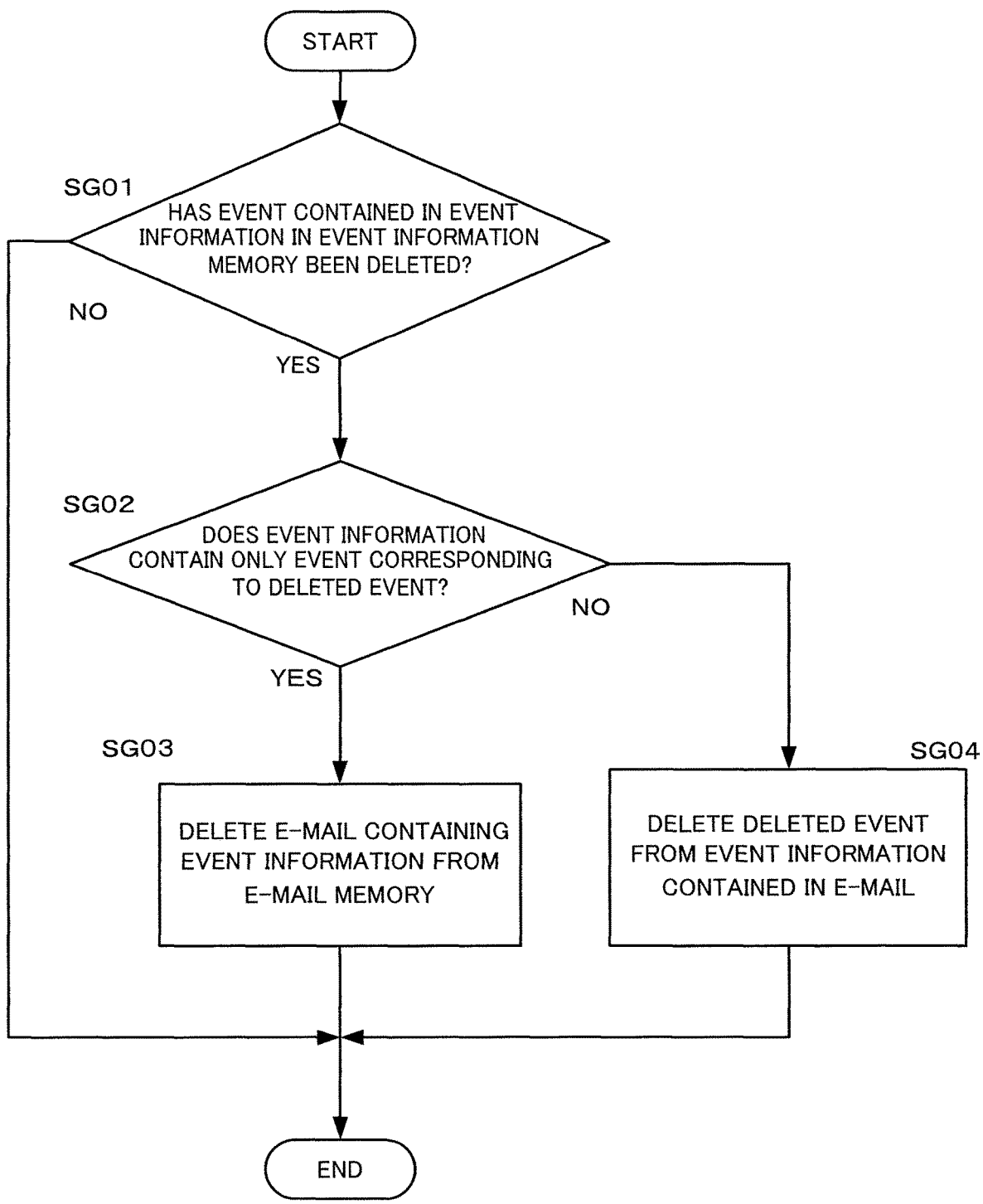
FIG. 17 is a flowchart illustrating the processes executed by an event information detector and an e-mail deleter illustrated in FIG. 8.

FIG. 17 is a flowchart illustrating the processes executed by the event information detector and the e-mail deleter of the fourth embodiment (FIG. 8) of the controller. The processes executed will be described according to the respective steps.

In step SG01, it is determined whether or not an event contained in the event information in the event information memory is deleted. When the event is deleted (YES), the flow proceeds to step SG02. When the event is not deleted (NO), this process ends.

In step SG02, it is determined whether or not the event information is event information that contains only a deleted event. When the event information is the event information that contains only the deleted event (YES), the flow proceeds to step SG03. When the event information is not the event information that contains only the deleted event (NO), the flow proceeds to step SG04.

In step SG03, the e-mail that contains the event information is deleted from the e-mail memory, and this process ends.

In step SG04, the deleted event is deleted from the event information that is contained in the e-mail, and this process ends.

Figure 18:
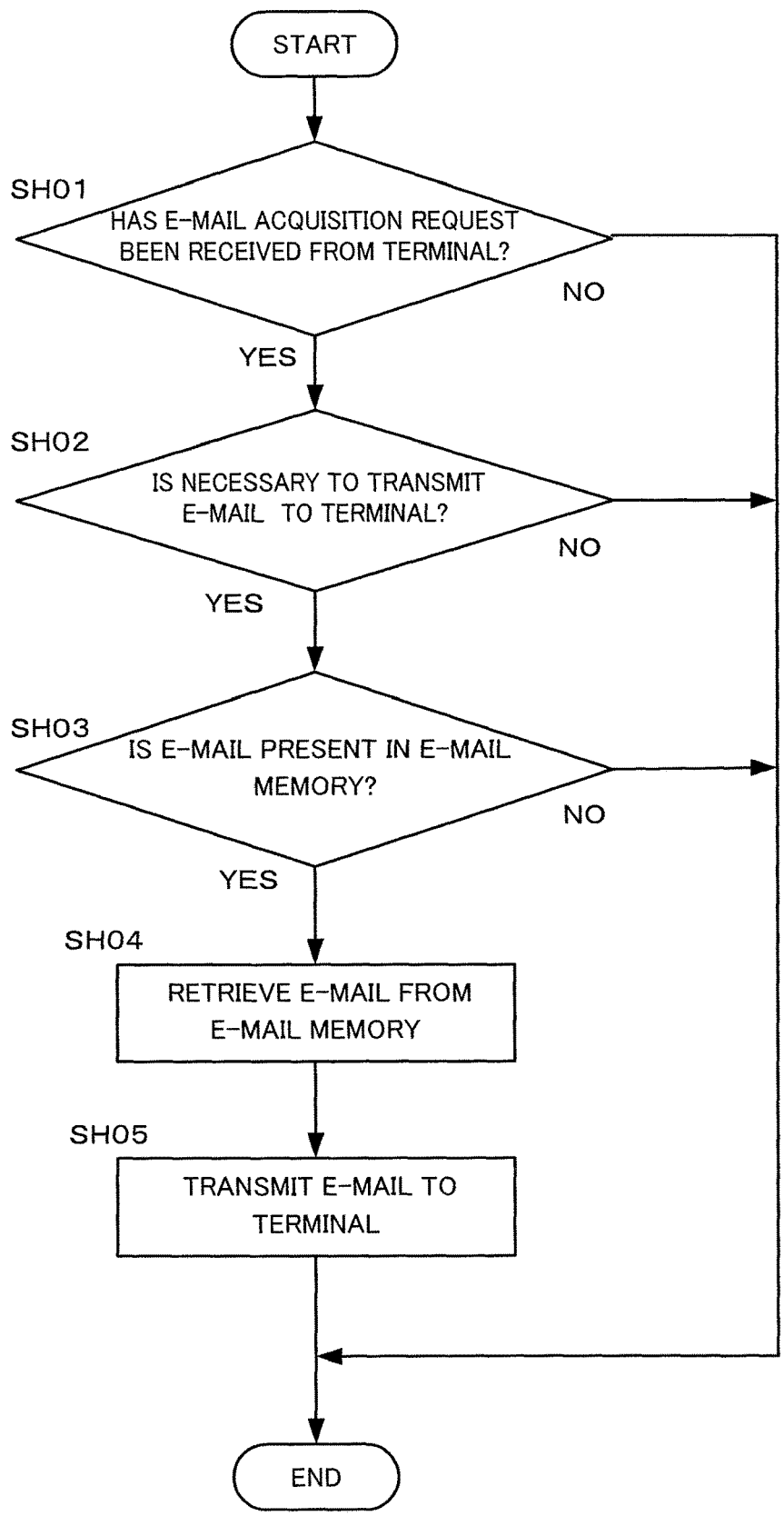
FIG. 18 is a flowchart illustrating the processes executed by an e-mail acquisition request receiver and an e-mail transmitter illustrated in FIGS. 6 and 8.

FIG. 18 is a flowchart illustrating the processes executed by the e-mail acquisition request receiver and the e-mail transmitter of the second embodiment (FIG. 6) and the fourth embodiment (FIG. 8) of the controller. The processes executed will be described according to the respective steps.

In step SH01, it is determined whether or not an e-mail acquisition request is received from a terminal. When the e-mail acquisition request is received (YES), the flow proceeds to step SH02. When the e-mail acquisition request is not received (NO), this process ends.

In step SH02, it is determined whether or not it is necessary to transmit an e-mail to a terminal. When it is necessary to transmit the e-mail (YES), the flow proceeds to step SH03. When it is not necessary to transmit the e-mail (NO), this process ends.

In step SH03, it is determined whether or not an e-mail is present in the e-mail memory. When the e-mail is present (YES), the flow proceeds to step SH04. When the e-mail is not present (NO), this process ends.

In step SH04, the e-mail is retrieved from the e-mail memory.

In step SH05, the e-mail is transmitted to the terminal, and this process ends.

What is claimed is:

1. A machine comprising:
   at least one of a machine tool, an industrial machine, and a robot;
   a controller configured to control the at least one of the machine tool, the industrial machine, and the robot, the controller having a function of transmitting information on at least one of the controller and the at least one of the machine tool, the industrial machine, and the robot controlled by the controller from the controller to a terminal located at a distance from the controller via an e-mail, the controller including a memory and a processor; and
   a local area network (LAN) device and a router configured to connect the terminal to the controller,
   wherein the processor is configured to perform a method comprising:
      detecting an event that has occurred in at least one of the controller and the at least one of the machine tool, the industrial machine, and the robot;
      composing event information containing at least one event that has occurred in the at least one of the controller and the at least one of the machine tool, the industrial machine, and the robot;
      storing, in the memory, the composed event;
      adding, when a new event occurs after the event information is composed, the new event to the event information stored in the memory;
      updating, when the event contained in the event information stored in the memory is changed after the event information is composed, the changed event contained in the event information stored in the memory;
      deleting, when the event is canceled after the event information is composed, the cancelled event from the event information stored in the memory;
      receiving an e-mail acquisition request from the terminal;
      acquiring the event information stored in the memory based on the received e-mail acquisition request;
      composing an e-mail that contains the acquired event information based on the received e-mail acquisition request; and
      transmitting the composed e-mail containing the acquired event information directly to the terminal according to one of a post office protocol (POP) or an Internet mail access protocol (IMAP), via the LAN device and the router without use of an Internet network and a transmission-side mail server for delivering an e-mail to another mail server, based on the received e-mail acquisition request.

2. The machine according to claim 1, wherein the received email acquisition request is received and the composed e-mail is transmitted according to the POP communication protocol.

3. The machine according to claim 1, wherein the received email acquisition request is received and the composed e-mail is transmitted according to the IMAP communication protocol.

4. The machine according to claim 1, wherein the event information is any one of alarm information of the controller, alarm information of the at least one of the machine tool, the industrial machine, and the robot, operating information of the controller, and operating information of the at least one of the machine tool, the industrial machine, and the robot.

5. The machine according to claim 1, comprising:
   a mail retrieval agent that communicates with a mail user agent in the terminal, wherein receiving the e-mail acquisition request from the terminal and transmitting the composed e-mail containing the acquired event information directly to the terminal are performed by the mail retrieval agent.

6. A machine comprising:
   at least one of a machine tool, an industrial machine, and a robot;
   a controller configured to control the at least one of the machine tool, the industrial machine, and the robot, the controller having a function of transmitting information on at least one of the controller and the at least one of the machine tool, the industrial machine, and the robot controlled by the controller from the controller to a terminal located at a distance from the controller via an e-mail, the controller including a memory and a processor; and
   a local area network (LAN) device and a router configured to connect the terminal to the controller,
   wherein the processor configured to perform a method comprising:
      detecting an event that has occurred in at least one of the controller and the at least one of the machine tool, the industrial machine, and the robot;
      composing event information containing at least one event that has occurred in the at least one of the controller and the at least one of the machine tool, the industrial machine, and the robot;
      storing, in the memory, the composed event information;
      detecting a change in the event information stored in the memory;
      adding, when a new event occurs after the event information is composed, the new event to the event information stored in the memory;
      updating, when the event contained in the event information stored in the memory is changed after the event information is composed, the changed event contained in the event information stored in the memory;
      deleting, when the event is canceled after the event information is composed, the cancelled event from the event information stored in the memory;
      acquiring, when a change is detected in the event information, the event information stored in the memory;
      composing an e-mail that contains the acquired event information;
      storing, in the memory, the composed e-mail;
      receiving an e-mail acquisition request from the terminal; and
      transmitting the composed e-mail containing the acquired event information directly to the terminal according to one of a post office protocol (POP) or an Internet mail access protocol (IMAP), via the LAN device and the router without use of an Internet network and a transmission-side mail server for delivering an e-mail to another mail server, based on the received e-mail acquisition request.

7. The machine according to claim 6, wherein the processor is further configured to perform the method comprising:

updating the event information contained in the composed e-mail, when a new event occurs and is detected after the event information is composed and when the new event is added to the event information;

updating the event information contained in the composed email, when the event contained in the event information stored in the memory is changed and detected after the event information is composed;

deleting, when at least one event has been canceled and detected after the event information is composed, the cancelled event of the event information contained in the composed email; and deleting, when all events have been canceled after the event information is composed, the composed email.

8. The machine according to claim 7, wherein the received email acquisition request is received and the composed e-mail is transmitted according to the POP communication protocol.

9. The machine according to claim 7, wherein the received email acquisition request is received and the composed e-mail is transmitted according to the IMAP communication protocol.

10. The machine according to claim 7, wherein the event information is any one of alarm information of the controller, alarm information of the at least one of the machine tool, the industrial machine, and the robot, operating information of the controller, and operating information of the at least one of the machine tool, the industrial machine, and the robot.

11. The machine according to claim 6, wherein the received email acquisition request is received and the composed e-mail is transmitted according to the POP communication protocol.

12. The machine according to claim 6, wherein the received email acquisition request is received and the composed e-mail is transmitted according to the IMAP communication protocol.

13. The machine according to claim 6, wherein the event information is any one of alarm information of the controller, alarm information of the at least one of the machine tool, the industrial machine, and the robot, operating information of the controller, and operating information of the at least one of the machine tool, the industrial machine, and the robot.

14. The machine according to claim 6, comprising:
a mail retrieval agent that communicates with a mail user agent in the terminal, wherein receiving the e-mail acquisition request from the terminal and transmitting the composed e-mail containing the acquired event information directly to the terminal are performed by the mail retrieval agent.

* * * * *